US012063289B2

(12) United States Patent
Suzuki et al.

(10) Patent No.: US 12,063,289 B2
(45) Date of Patent: Aug. 13, 2024

(54) COMMUNICATION SYSTEM, SUBSCRIBER LINE TERMINAL APPARATUS AND COMMUNICATION METHOD

(71) Applicant: NIPPON TELEGRAPH AND TELEPHONE CORPORATION, Tokyo (JP)

(72) Inventors: Takahiro Suzuki, Musashino (JP); Noriyuki Ota, Musashino (JP); Hiroyuki Uzawa, Musashino (JP); Hirotaka Ujikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 323 days.

(21) Appl. No.: 17/435,189

(22) PCT Filed: Mar. 2, 2020

(86) PCT No.: PCT/JP2020/008582
§ 371 (c)(1),
(2) Date: Aug. 31, 2021

(87) PCT Pub. No.: WO2020/179722
PCT Pub. Date: Sep. 10, 2020

(65) Prior Publication Data
US 2022/0150042 A1    May 12, 2022

(30) Foreign Application Priority Data
Mar. 5, 2019 (JP) ................................ 2019-039434

(51) Int. Cl.
*H04L 7/00*     (2006.01)
*H04L 12/44*    (2006.01)

(52) U.S. Cl.
CPC .......... *H04L 7/0016* (2013.01); *H04L 7/0054* (2013.01); *H04L 12/44* (2013.01)

(58) Field of Classification Search
CPC ...... H04L 7/0016; H04L 7/0054; H04L 12/44
(Continued)

(56) References Cited

U.S. PATENT DOCUMENTS 9,210,488 B2 * 12/2015 Sun ..................... H04Q 11/0071
11,539,437 B2 * 12/2022 Liyama .................. H04B 10/60
(Continued)

FOREIGN PATENT DOCUMENTS

WO    WO-2013191608 A1 * 12/2013    ............ H04J 3/0664

OTHER PUBLICATIONS

Urano et al; The 10G-EPON OLT and ONU LSIs for the coexistence of 10G-EPON and GE-PON toward the next FTTH era ; 2011; VLSI circuit design Symposium technical Paper; pp. 1-2. (Year: 2011).*

(Continued)

*Primary Examiner* — Amritbir K Sandhu
(74) *Attorney, Agent, or Firm* — Harness, Dickey & Pierce, P.L.C.

(57) ABSTRACT

A communication system includes a first processor that performs processing for transmitting a signal to and receiving a signal from a communication destination device and a second processor that performs processing of an additional function. The second processor includes a decoding unit that decodes a transmission signal encoded by the first processor or a reception signal encoded by the communication destination device, an information acquiring unit that acquires information from the transmission signal or the reception signal decoded by the decoding unit, an additional function executing unit that performs the processing of the additional function using the information acquired by the information acquiring unit, and an encoding unit that performs process- (Continued)

ing for encoding the decoded transmission signal and outputting a resulting signal to the communication destination device or processing for encoding the decoded reception signal and outputting a resulting signal to the first processor.

4 Claims, 16 Drawing Sheets

(58) Field of Classification Search
USPC .......................................................... 398/155
See application file for complete search history.

(56) References Cited

U.S. PATENT DOCUMENTS

| | | | |
|---|---|---|---|
| 2008/0198051 A1* | 8/2008 | Tanimura | H03M 1/1255 |
| | | | 341/137 |
| 2011/0142437 A1* | 6/2011 | Luo | H04J 3/0608 |
| | | | 398/1 |
| 2015/0030328 A1* | 1/2015 | Fukuda | H04L 41/12 |
| | | | 398/58 |
| 2015/0163049 A1* | 6/2015 | Nors | H04J 3/0664 |
| | | | 398/98 |
| 2019/0158220 A1* | 5/2019 | Gao | H04L 1/0041 |
| 2019/0190650 A1* | 6/2019 | Gao | H04L 1/0009 |
| 2021/0392064 A1* | 12/2021 | Suzuki | H04L 43/0864 |
| 2022/0149951 A1* | 5/2022 | Wang | H04B 10/516 |
| 2022/0150042 A1* | 5/2022 | Suzuki | H04L 7/0054 |
| 2023/0224041 A1* | 7/2023 | Zhong | H04B 10/2513 |
| | | | 398/147 |

OTHER PUBLICATIONS

Miyazaki et al; MAC LSI Design Technology for Optical Access Communications; Mar. 2011; NTT Microsystem integration Laboratories; pp. 1-8. (Year: 2011).*

Zhao et al; WR-enhanced TDM-PON with nanosecond clock and data recovery and picosecond time synchronization; Mar. 2024; Journal of optical Networking and Communications; pp. 1-10. (Year: 2024).*

Part 3: Carrier Sense Multiple Access with Collision Detection (CSMA/CD) Access Method and Physical Layer Specifications Amendment 1: Physical Layer Specifications and Management Parameters for 10 GB/s Passive Optical Networks, IEEE Std 802.3av—2009 IEEE Standard for Information technology—Telecommunications and information exchange between systems—Local and metropolitan area networks—Specific requirements—Oct. 30, 2009.

10-Gigabit-capable passive optical networks (XG-PON): General requirements, Recommendation ITU-T G.987.1, Jan. 2010.

Part 3: Carrier Sense Multiple Access with Collision Detection (CSMA/CD) Access Method and Physical Layer Specifications Amendment: Media Access Control Parameters, Physical Layers, and Management Parameters for Subscriber Access Networks, IEEE Std 802.3ah—2004 IEEE Standard for Information technology—Telecommunications and information exchange between systems—Local and metropolitan area networks—Specific requirements, Sep. 7, 2004.

Gigabit-capable passive optical networks (GPON): General characteristics, Recommendation ITU-T G.984.1, Mar. 2008.

Takahiro Suzuki et al., Demonstration of 10-Gbps Real-Time Reed-Solomon Decoding Using GPU Direct Transfer and Kernel Scheduling for Flexible Access Systems, Journal of Lightwave Technology, vol. 36, No. 10, 2018, pp. 1875-1881.

* cited by examiner

Fig. 3

| Reserved | LLID | CRC | MAC DA | MAC SA | Type | MAC CTRL TYPE | Time Stamp | Message | FCS |

Fig. 4

| Reserved | LLID | CRC | Payload | ns
COMMUNICATION SYSTEM, SUBSCRIBER LINE TERMINAL APPARATUS AND COMMUNICATION METHOD

CROSS-REFERENCE TO RELATED APPLICATIONS

This application is a 371 U.S. National Phase of International Application No. PCT/JP2020/008582 filed on Mar. 2, 2020, which claims priority to Japanese Application No. 2019-039434 filed on Mar. 5, 2019. The entire disclosures of the above applications are incorporated herein by reference.

TECHNICAL FIELD

The present invention relates to a communication system, a subscriber line terminal station device, and a communication method.

BACKGROUND ART

PON (Passive Optical Network) systems are currently becoming popular in optical access networks. In a PON system, a single subscriber line terminal station device (optical line terminal; OLT) communicates with a plurality of subscriber line terminal devices (optical network units; ONUs) by using time division multiplexing (TDM) for downstream communication and using time division multiple access (TDMA) for upstream communication. Thus, a plurality of ONUs are covered by a single OLT to realize high economic efficiency. 10G-EPON (see NPL 1, for example) and XGS-PON (see NPL 2, for example) of the level of 10 Gbps (gigabits per second) and GE-PON (see NPL 3, for example) and GPON (see NPL 4, for example) of the level of 1 Gbps are standardized by the IEEE (Institute of Electrical and Electronics Engineers) and the ITU-T (International Telecommunication Union-Telecommunication Standardization Sector).

On the other hand, virtualization is attracting attention in the field of networks. Communication devices are conventionally constituted by dedicated hardware. Therefore, functions are fixed, and long-term large-scale development is required for individual purposes. In order to flexibly change the functions and realize devices through small-scale software, agile development of each function, virtualization technologies are applied to such devices for software implementation of functions in general-purpose hardware.

Applying virtualization to optical access systems is also considered, and a consideration is given to a configuration in which an OLT, which has been conventionally constituted by dedicated hardware, is constituted by general-purpose hardware and functions are implemented using software (see NPL 5, for example). With this configuration, new functions can be installed and functions of the device can be replaced to commonize the device and share resources, and therefore a reduction in CAPEX (Capital Expenditure) can be expected.

As an approach for applying virtualization technologies to optical access systems, it can be considered sharing functions between a PON LSI (Large-Scale Integration) and general-purpose hardware. Standardized PON functions are often installed in the PON LSI, which is a processor of dedicated hardware. Therefore, if a commercially available PON LSI is used for PON basic functions and a general-purpose processor is used for other functions, it is possible to achieve the above-described advantages of virtualization using the minimum resources of the general-purpose processor. For example, a unique function of a network operator that is not installed in a non-standardized PON LSI can be installed in the general-purpose hardware, and devices having various functions can be realized using the common hardware. For example, a CPU (Central Processing Unit), a GPU (Graphics Processing Unit), an FPGA (Field Programmable Gate Array), or the like is used as the general-purpose processor.

In a case where functions are shared between the PON LSI and the general-purpose hardware as described above, parameters of PON functions are necessary depending on the unique function implemented in the general-purpose hardware. That is, parameters that are used need to be shared between the PON LSI and the general-purpose processor.

CITATION LIST

Non Patent Literature

[NPL 1] IEEE Std 802.3av-2009, IEEE Computer Society
[NPL 2] "10-Gigabit-capable passive optical networks (XG-PON): General requirements", Recommendation ITU-T 6.987.1,2010
[NPL 3] IEEE Standard 802.3ah-2004,IEEE Computer Society
[NPL 4] "Gigabit-capable passive optical networks (GPON): General characteristics", Recommendation ITU-T 6.984.1,2008
[NPL 5] Takahiro Suzuki, Sang-Yuep Kim, Jun-ichi Kani, Toshihiro Hanawa, Ken-Ichi Suzuki, Akihiro Otaka, "Demonstration of 10-Gbps Real-Time Reed-Solomon Decoding Using GPU Direct Transfer and Kernel Scheduling for Flexible Access Systems", Journal of Lightwave Technology, May, 2018, Vol. 36, No. 10, p. 1875-1881

SUMMARY OF THE INVENTION

Technical Problem

When a PON LSI and a general-purpose processor are connected to each other, as a method for the general-purpose processor to acquire a parameter of a function implemented in the PON LSI, it can be considered reading the parameter by the general-purpose processor from the PON LSI or reading the parameter by the PON LSI from the general-purpose processor each time the parameter is necessary. If such a method is employed, the number of times the parameter is read increases, and accordingly, a delay occurs. In addition, physical coding is performed on output from the PON LSI, which is received by the general-purpose processor, and an upstream signal from an ONU to an OLT, which is input to the general-purpose processor. Therefore, it is difficult for the general-purpose processor to directly take out a parameter to be shared between the general-purpose processor and the PON LSI from a frame.

In view of the above circumstances, the present invention aims to provide a communication system, a subscriber line terminal station device, and a communication method that enable communication with another device while suppressing an increase of delay by using a configuration in which a plurality of processors that perform processing while sharing information are used.

Means for Solving the Problem

An aspect of the present invention is a communication system that includes: a first processor configured to perform processing for transmitting a signal to and receiving a signal from a communication destination device; and a second processor configured to perform processing of an additional function, wherein the second processor includes: a decoding unit that decodes a transmission signal encoded by the first processor or a reception signal encoded by the communication destination device; an information acquiring unit that acquires information from the transmission signal or the reception signal decoded by the decoding unit; an additional function executing unit that performs the processing of the additional function using the information acquired by the information acquiring unit; and an encoding unit that performs processing for encoding the decoded transmission signal and outputting a resulting signal to the communication destination device or processing for encoding the decoded reception signal and outputting a resulting signal to the first processor.

An aspect of the present invention is the communication system described above, wherein the second processor further includes an updating unit that updates time information acquired by the information acquiring unit from the transmission signal in synchronization with a first clock included in the first processor or a second clock included in the second processor.

An aspect of the present invention is the communication system described above, wherein the second processor further includes a correction unit that corrects the time information using a difference between a time at which predetermined processing is started in the communication destination device and a time at which the additional function is started in the second processor.

An aspect of the present invention is the communication system described above, wherein the second processor further includes: a first time rewriting unit that rewrites the time information that is set in the transmission signal decoded by the decoding unit, by using time information that is output from the second clock; and a second time rewriting unit that rewrites time information that is set in the reception signal transmitted from the communication destination device and decoded by the decoding unit, by using time information that is output from the second clock and time information that has been set in the transmission signal before rewriting, the reception signal being transmitted with respect to the transmission signal in which the time information has been rewritten.

An aspect of the present invention is a subscriber line terminal station device that includes: a first processor configured to perform communication processing of a passive optical network on a signal that is transmitted to or received from a subscriber line terminal device; and a second processor configured to perform processing of an additional function, wherein the second processor includes: a decoding unit that decodes a transmission signal encoded by the first processor or a reception signal encoded by the subscriber line terminal device; an information acquiring unit that acquires information from the transmission signal or the reception signal decoded by the decoding unit; an additional function executing unit that performs the processing of the additional function using the information acquired by the information acquiring unit; and an encoding unit that performs processing for encoding the decoded transmission signal and outputting a resulting signal to the subscriber line terminal device or processing for encoding the decoded reception signal and outputting a resulting signal to the first processor.

An aspect of the present invention is a communication method to be carried out in a communication system that includes a first processor and a second processor, the communication method includes: a transmission/reception processing step of performing, by the first processor, processing for transmitting a signal to or receiving a signal from a communication destination device; a decoding step of decoding, by the second processor, a transmission signal encoded by the first processor or a reception signal encoded by the communication destination device; an information acquisition step of acquiring, by the second processor, information from the transmission signal or the reception signal decoded in the decoding step; an additional function executing step of performing, by the second processor, processing of an additional function using the information acquired in the information acquisition step; and an encoding step of performing, by the second processor, processing for encoding the decoded transmission signal and outputting a resulting signal to the communication destination device or processing for encoding the decoded reception signal and outputting a resulting signal to the first processor.

Effects of the Invention

According to the present invention, communication can be performed with another device while suppressing an increase of delay by using a configuration in which a plurality of processors that perform processing while sharing information are used.

BRIEF DESCRIPTION OF DRAWINGS

FIG. 3 is a diagram showing an example of an MPCP frame that is used in the PON system according to the embodiment.

FIG. 4 is a diagram showing an example of a main signal frame that is used in the PON system according to the embodiment.

DESCRIPTION OF EMBODIMENTS

The following describes embodiments of the present invention in detail with reference to the drawings.

Figure 1:
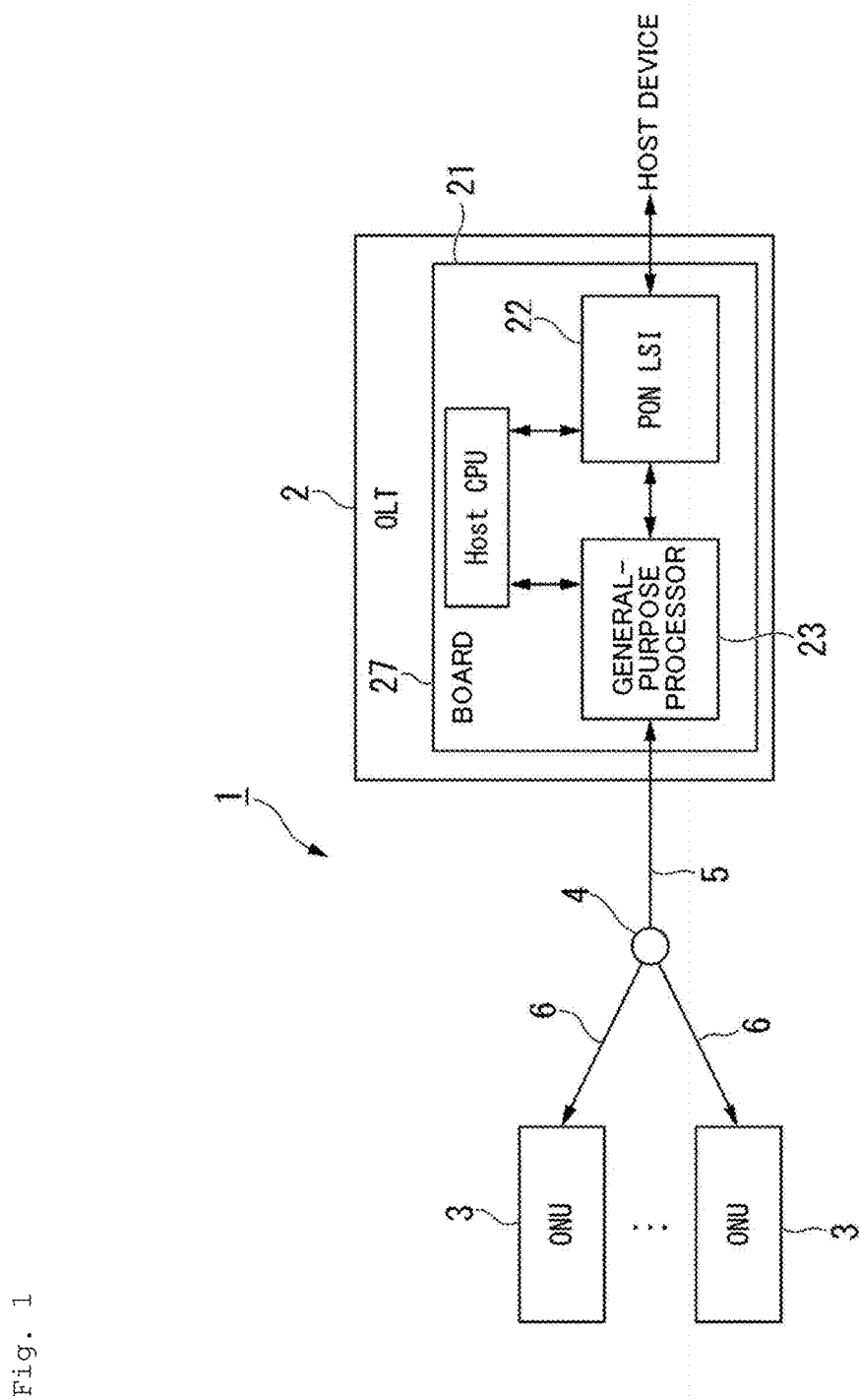
FIG. 1 is a diagram showing an example configuration of a PON system according to an embodiment of the present invention.

FIG. 1 is a diagram showing an example configuration of a PON system 1 according to the present embodiment. The PON system 1 includes an OLT 2, which is a station building device, and M (M is an integer greater than or equal to 1) ONUs 3, which are user-side devices. The OLT 2 is connected to a host device. The OLT 2 outputs signals (downstream signals) that are to be transmitted to the M ONUs 3, to an optical fiber 5, by multiplexing the signals using a TDM method. An optical coupler 4 transfers the multiplexed downstream signals by causing the signals to diverge into optical fibers 6 that are respectively connected to the ONUs 3. Each ONU 3 selects and receives a downstream signal transmitted to the ONU 3 from the multiplexed downstream signals. The M ONUs 3 respectively output signals (upstream signals) that are to be transmitted to the OLT 2, to the optical fibers 6. The optical coupler 4 transmits the upstream signals output from the ONUs 3 via the optical fiber 5 to the OLT 2 by multiplexing the signals using a TDMA method.

The OLT 2 is an example of a communication system that includes a plurality of processors. The OLT 2 includes a PON LSI 22, a general-purpose processor 23, and a host CPU 27. In FIG. 1, the PON LSI 22, the general-purpose processor 23, and the host CPU 27 are mounted on a board 21. The PON LSI 22 is a dedicated processor, for example, and executes processing of PON functions. The general-purpose processor 23 is a CPU, a GPU, or an FPGA, for example. The general-purpose processor 23 implements a unique function of a network operator, for example. The unique function is any function that is executed in addition to the PON functions of the PON LSI 22. The host CPU 27 controls data transmission between the PON LSI 22 and the general-purpose processor 23 and executes PON functions of an upper layer.

Here, Point-to-Multi-Point (MPCP) discovery (see NPL 1, for example) in the PON system 1 will be described. When an ONU 3 is connected to the PON system 1, the OLT 2 performs the MPCP discovery. In the MPCP discovery, the ONU 3 is found by the OLT 2, a distance between the OLT 2 and the ONU 3 is measured, and time is synchronized between the OLT 2 and the ONU 3.

Figure 2:
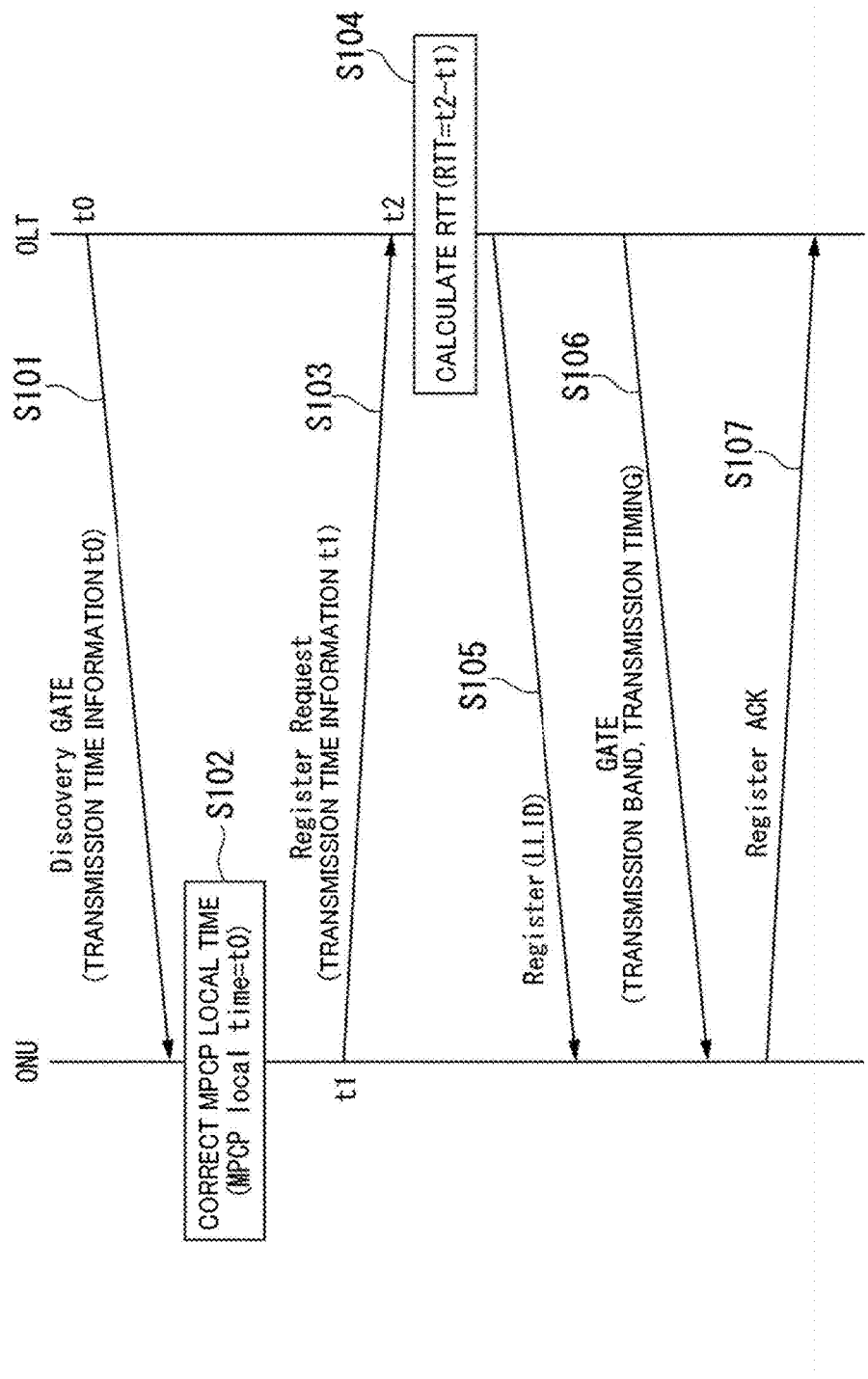
FIG. 2 is a diagram showing a flow of MPCP discovery in the PON system according to the embodiment.

FIG. 2 is a diagram showing a flow of the MPCP discovery in the PON system 1. First, the OLT 2 transmits a Discovery GATE signal to the ONU 3 (step S101). The OLT 2 sets, in the Discovery GATE signal, transmission time information t0 regarding the time of transmission from the OLT 2 for distance measurement. Thus, the OLT 2 notifies the unregistered ONU 3 of the transmission time information t0. The ONU 3 corrects MPCP local time in the ONU 3, taking the transmission time information t0 that has been received from the OLT 2 using the Discovery GATE signal to be the current time (step S102). After the correction, the ONU 3 transmits a Register Request signal to the OLT 2 (step S103). The Register Request signal is a request for registration given from the unregistered ONU 3 to the OLT 2. The ONU 3 sets, in the Register Request signal, transmission time information t1 regarding the time of transmission from the ONU 3 for distance measurement to notify the OLT 2 of the transmission time information t1.

The OLT 2 calculates a round trip time (RTT) from the transmission time information t1 received using the Register Request signal and reception time information t2 that indicates MPCP local time in the OLT 2 when the Register Request signal is received, by using the following expression: t2−t1 (step S104). Thereafter, the OLT 2 notifies the unregistered ONU 3 of a Logical Link ID (LLID) using a Register signal (step S105). The LLID is an identification ID of the ONU 3 that is the source or the destination of transmission. Furthermore, the OLT 2 notifies the ONU 3 of a transmission band and a transmission timing using a GATE signal (step S106). Thereafter, the ONU 3 transmits a Register ACK signal, which is a response indicating reception of the Register signal, to the OLT 2 (step S107). Thus, the PON system 1 completes the MPCP discovery.

FIG. 3 is a diagram showing an example of an MPCP frame that is used in the PON system 1. The MPCP frame includes fields such as Reserved, LLID, CRC (Cyclic Redundancy Check), MAC DA (Medium Access Control Destination Address), MAC SA (Medium Access Control Source Address), Type, MAC control type (MAC CTRL TYPE), Time Stamp, Message, and FCS (Frame Check Sequence). MPCP local time such as the transmission time information t0 or t1 is set in the time stamp field of the MPCP frame. Also, an MPCP frame to which transmission time information for time synchronization is added is periodically transmitted to correct a difference in time information between the OLT and the ONU and to measure the RTT again.

Figure 4:
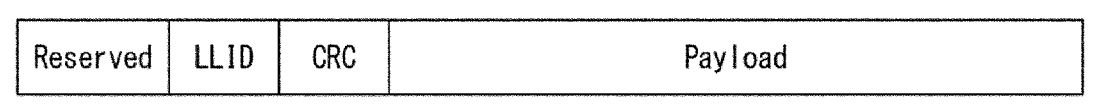

FIG. 4 is a diagram showing an example of a main signal frame after establishment of the MPCP discovery, which is used in the PON system 1. After the MPCP discovery is established, the main signal frame is used between the OLT 2 and the ONU 3. The main signal frame shown in FIG. 4 includes an LLID and a CRC code for detecting an error for the main signal, in a preamble region.

When a main signal is output from the PON LSI 22 to the general-purpose processor 23 in the OLT 2, the general-purpose processor 23 takes out a parameter of a PON function from a main signal for the MPCP discovery or an upstream or downstream main signal after establishment of communication, and holds the parameter. Also, the general-purpose processor 23 detects a PON frame and performs physical decoding to read out information regarding an L2 (layer 2) frame.

The general-purpose processor 23 takes out, as the parameter, MPCP local time that is set by the PON LSI 22 in the PON frame, for example. In a case where the parameter shared between the PON LSI 22 and the general-purpose processor 23 is time information such as the MPCP local time, a clock difference may occur between the PON LSI 22 and the general-purpose processor 23 after the time information is acquired. Due to the clock difference, a difference occurs between a time at which the general-purpose processor uses the time information in a unique function and a time at which the ONU uses the time information in a unique function. Therefore, in the present embodiment, the general-purpose processor 23 inputs the same clock as that of the PON LSI 22 and, after taking out time information (MPCP local time) from a main signal for the MPCP discovery, increments the time information in synchronization with the input clock.

Also, when the MPCP local time is used in the unique function of the general-purpose processor 23, the MPCP local time in the general-purpose processor 23 is corrected to be synchronized with the ONU 3. The general-purpose processor 23 may also increment the MPCP local time that has been read out from the main signal and held, using the clock of the general-purpose processor 23 as a master clock.

In this case, the time is corrected by rewriting the Time Stamp in the MPCP frame in the general-purpose processor 23.

The following describes details of embodiments of the OLT 2.

First Embodiment

Figure 5:
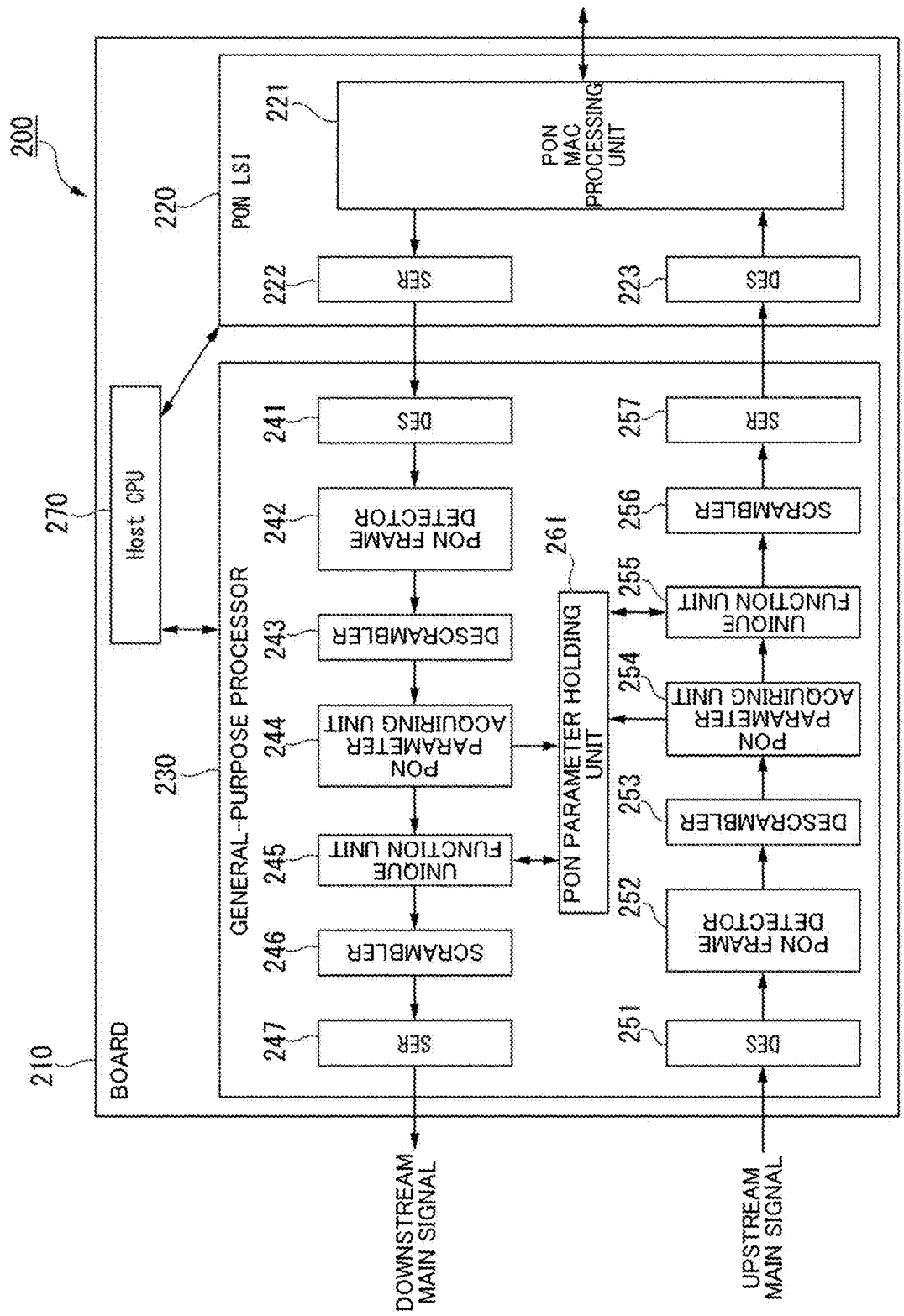
FIG. 5 is a block diagram showing a configuration of an OLT according to a first embodiment.

FIG. 5 is a block diagram showing details of a configuration of an OLT 200 according to a first embodiment. The OLT 200 includes a board 210 on which a PON LSI 220, a general-purpose processor 230, and a host CPU 270 are mounted. The board 210, the PON LSI 220, the general-purpose processor 230, and the host CPU 270 respectively correspond to the board 21, the LSI 22, the general-purpose processor 23, and the host CPU 27 of the OLT 2 shown in FIG. 1. In the OLT 200, a PON parameter is shared between the PON LSI 220 and the general-purpose processor 230, and the OLT 200 executes a unique function according to the parameter.

The PON LSI 220 has a configuration common to commercially available products. The PON LSI 220 includes a PON MAC processing unit 221, a serializer (SER) 222, and a deserializer (DES) 223. The PON MAC processing unit 221 performs PON MAC processing on a downstream signal that is received from a host device and an upstream signal that is transmitted to the host device. The serializer 222 performs serialization on a downstream signal subjected to the PON MAC processing by the PON MAC processing unit 221 to convert a parallel signal into a serial signal, and outputs a resulting signal to the general-purpose processor 230. The deserializer 223 performs deserialization on an upstream signal input from the general-purpose processor 230 to convert a serial signal into a parallel signal, and outputs a resulting signal to the PON MAC processing unit 221.

The general-purpose processor 230 includes a deserializer (DES) 241, a PON frame detector 242, a descrambler 243, a PON parameter acquiring unit 244, a unique function unit 245, a scrambler 246, a serializer (SER) 247, a deserializer (DES) 251, a PON frame detector 252, a descrambler 253, a PON parameter acquiring unit 254, a unique function unit 255, a scrambler 256, a serializer (SER) 257, and a PON parameter holding unit 261.

The deserializer 241 performs deserialization on a downstream signal that is input from the PON LSI 220. The PON frame detector 242 detects a PON frame of the downstream signal. The descrambler 243 performs descrambling processing on the PON frame of the downstream signal. The PON parameter acquiring unit 244 acquires a PON parameter from the downstream signal subjected to the descrambling processing, and outputs the acquired PON parameter to the PON parameter holding unit 261. The unique function unit 245 performs processing of a unique function using the PON parameter acquired from the PON parameter holding unit 261. The scrambler 246 performs scrambling processing on the PON frame of the downstream signal. The serializer 247 performs serialization on the downstream signal subjected to the scrambling processing, and outputs a resulting signal.

The deserializer 251 performs deserialization on an upstream signal from the ONU 3. The PON frame detector 252 detects a PON frame of the upstream signal. The descrambler 253 performs descrambling processing on the PON frame of the upstream signal. The PON parameter acquiring unit 254 acquires a PON parameter from the upstream signal subjected to the descrambling processing, and outputs the acquired PON parameter to the PON parameter holding unit 261. The unique function unit 255 performs processing of the unique function using the PON parameter acquired from the PON parameter holding unit 261. The scrambler 256 performs scrambling processing on the PON frame of the upstream signal. The serializer 257 performs serialization on the upstream signal subjected to the scrambling processing, and outputs a resulting signal to the PON LSI 220.

Next, operations of the OLT 200 will be described. First, processing that is performed on a downstream main signal will be described. The PON MAC processing unit 221 outputs a main signal that is obtained by performing physical coding (scrambling processing, error correction, etc.) of the PON function on a downstream signal. The serializer 222 serializes the main signal output by the PON MAC processing unit 221, and outputs a resulting signal from the PON LSI 220 to the general-purpose processor 230.

The general-purpose processor 230 needs to decode information subjected to the physical coding by the PON LSI 220 to see content of an L2 frame of the main signal. Therefore, the deserializer 241 of the general-purpose processor 230 performs deserialization of the main signal input from the PON LSI 220, and the PON frame detector 242 detects a PON frame of the main signal. After the PON frame is detected, the descrambler 243 performs descrambling processing on the PON frame.

The PON parameter acquiring unit 244 acquires a PON parameter such as the time stamp (MPCP local time), LLID, Reserved, or CRC shown in FIG. 2, for example, from the L2 frame of the downstream main signal decoded by the descrambler 243. Parameters acquired by the PON parameter acquiring unit 244 also include other data that can be acquired from the preamble and data in the payload. The PON parameter acquiring unit 244 outputs the acquired PON parameter to the PON parameter holding unit 261 and stores the PON parameter therein. Also, the PON parameter acquiring unit 244 calls up the PON parameter from the PON parameter holding unit 261 and outputs the PON parameter to the unique function unit 245.

The unique function unit 245 executes the unique function according to the PON parameter. Thereafter, the scrambler 246 performs physical coding on the PON frame of the downstream signal output from the unique function unit 245, through scrambling processing, and outputs a resulting signal to the serializer 247. The serializer 247 performs serialization on the downstream main signal subjected to the scrambling processing, and outputs a resulting signal to the ONU 3.

Note that the host CPU 270 may transmit data to the PON parameter holding unit 261, and the PON parameter holding unit 261 may receive and hold the data. The unique function unit 245 can also read out the data transmitted by the host CPU 270 from the PON parameter holding unit 261 and execute the unique function according to the data value.

The OLT 200 performs processing on an upstream signal as well in an order similar to that of processing performed on the downstream signal. The deserializer 251 of the general-purpose processor 230 performs deserialization on an upstream main signal that is received from the ONU 3. The PON frame detector 252 detects a PON frame from upstream burst frames. After the PON frame is detected, the descrambler 253 performs descrambling processing on the PON frame to decode physically coded information. The PON parameter acquiring unit 254 acquires a PON parameter from the upstream main signal decoded by the descrambler 253. The PON parameter acquiring unit 254 outputs the acquired PON parameter to the PON parameter holding unit 261 and stores the PON parameter therein as necessary. Also, the PON parameter acquiring unit 254 outputs the PON parameter to the unique function unit 255 as necessary.

The unique function unit 255 executes the unique function according to the PON parameter. Thereafter, the scrambler 256 performs physical coding on the upstream main signal output from the unique function unit 255, through scrambling processing, and outputs a resulting signal to the serializer 257. The serializer 257 performs serialization on the upstream main signal subjected to the scrambling processing, and outputs a resulting signal to the PON LSI 220.

The unique function unit 255 for the upstream main signal may also have a function to restore the Reserved field of a received frame to a standard prescribed value to modify the upstream main signal to the form of a signal that can be received by the PON MAC processing unit 221.

Note that in FIG. 5, the PON LSI 220 includes a single PON port, and the general-purpose processor 230 performs processing with respect to the single port, but a configuration is also possible in which the PON LSI 220 includes a plurality of PON ports and the general-purpose processor 230 includes the functional units in the general-purpose processor 230 shown in FIG. 5 with respect to each of the ports.

Figure 6:
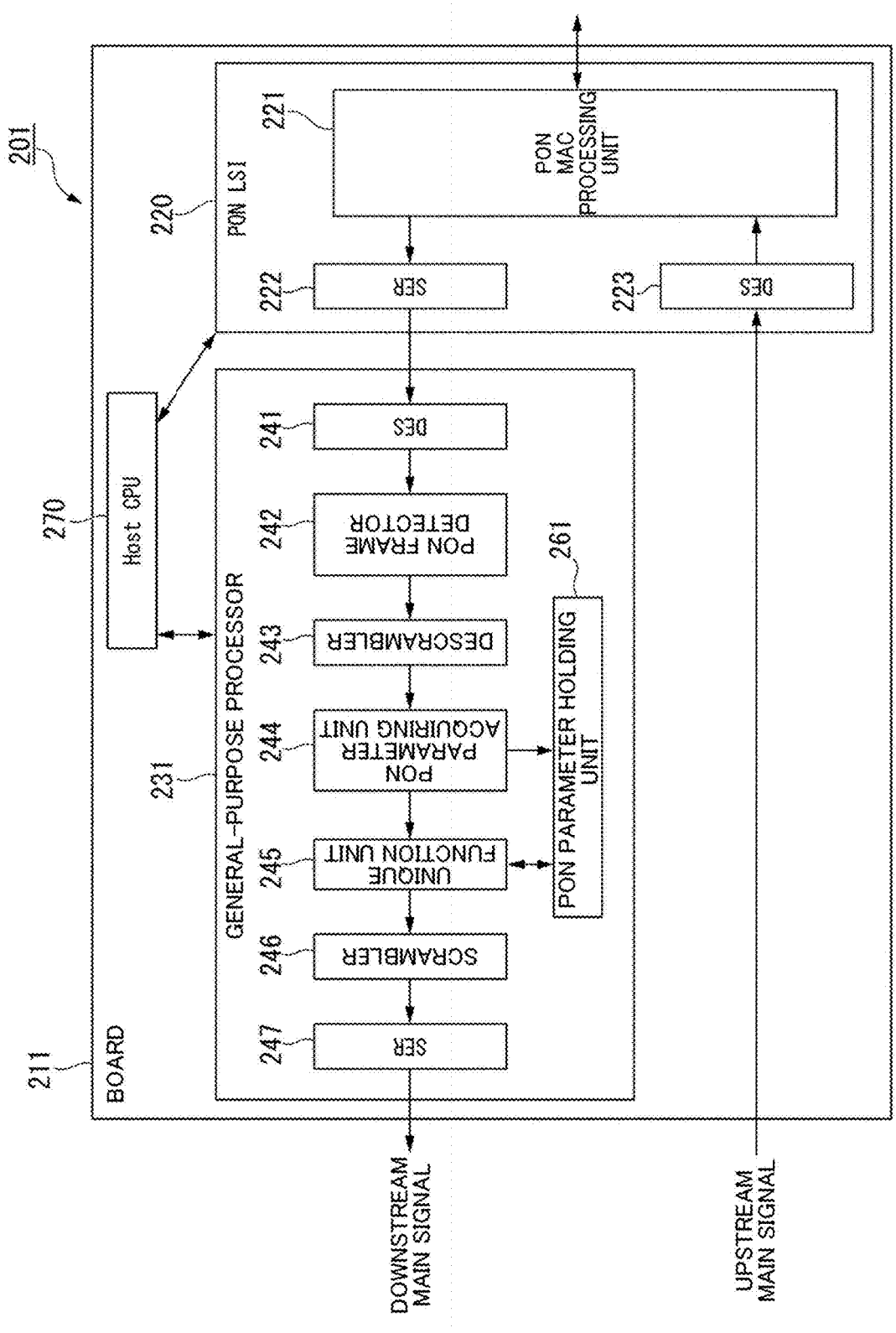
FIG. 6 is a block diagram showing a configuration of an OLT according to the first embodiment.
Figure 7:
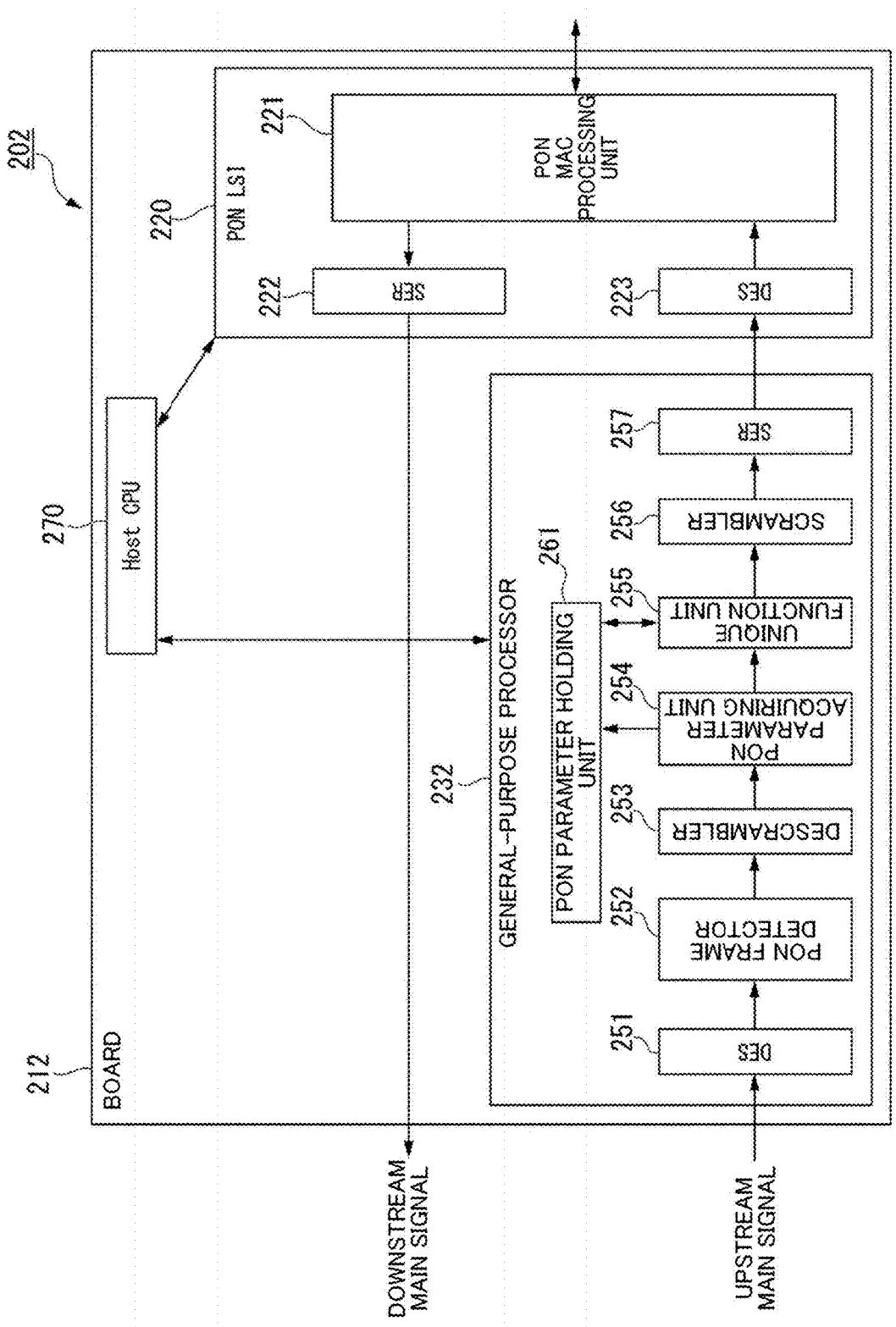
FIG. 7 is a block diagram showing a configuration of an OLT according to the first embodiment.

The OLT 2 may also be configured to implement the unique function with respect to only a downstream main signal as shown in FIG. 6 or implement the unique function with respect to only an upstream main signal as shown in FIG. 7.

FIG. 6 is a block diagram showing a configuration of an OLT 201 that implements the unique function with respect to only a downstream main signal. In FIG. 6, the same units as those of the OLT 200 shown in FIG. 5 are denoted with the same reference signs as those used in FIG. 5, and descriptions thereof are omitted. The OLT 201 includes a board 211. The board 211 includes the PON LSI 220, a general-purpose processor 231, and the host CPU 270. The general-purpose processor 231 differs from the general-purpose processor 230 shown in FIG. 5 in that the general-purpose processor 231 does not include the deserializer 251, the PON frame detector 252, the descrambler 253, the PON parameter acquiring unit 254, the unique function unit 255, the scrambler 256, and the serializer 257. The deserializer 223 of the PON LSI 220 receives an upstream main signal not via the general-purpose processor 231.

FIG. 7 is a block diagram showing a configuration of an OLT 202 that implements the unique function with respect to only an upstream main signal. In FIG. 7, the same units as those of the OLT 200 shown in FIG. 5 are denoted with the same reference signs as those used in FIG. 5, and descriptions thereof are omitted. The OLT 202 includes a board 212. The board 212 includes the PON LSI 220, a general-purpose processor 232, and the host CPU 270. The general-purpose processor 232 differs from the general-purpose processor 230 shown in FIG. 5 in that the general-purpose processor 232 does not include the deserializer 241, the PON frame detector 242, the descrambler 243, the PON parameter acquiring unit 244, the unique function unit 245, the scrambler 246, and the serializer 247. The serializer 222 of the PON LSI 220 transmits a downstream main signal to the ONU 3 not via the general-purpose processor 232.

According to the present embodiment, the general-purpose processors 230, 231, and 232 can share a PON parameter with the PON LSI 220 and execute the unique function using the shared PON parameter while suppressing an increase of delay.

Second Embodiment

An OLT according to the present embodiment synchronizes time information after the time information is shared between the PON LSI and the general-purpose processor through processing similar to that of the first embodiment. In particular, a method for synchronizing MPCP local time will be described in the present embodiment.

Figure 8:
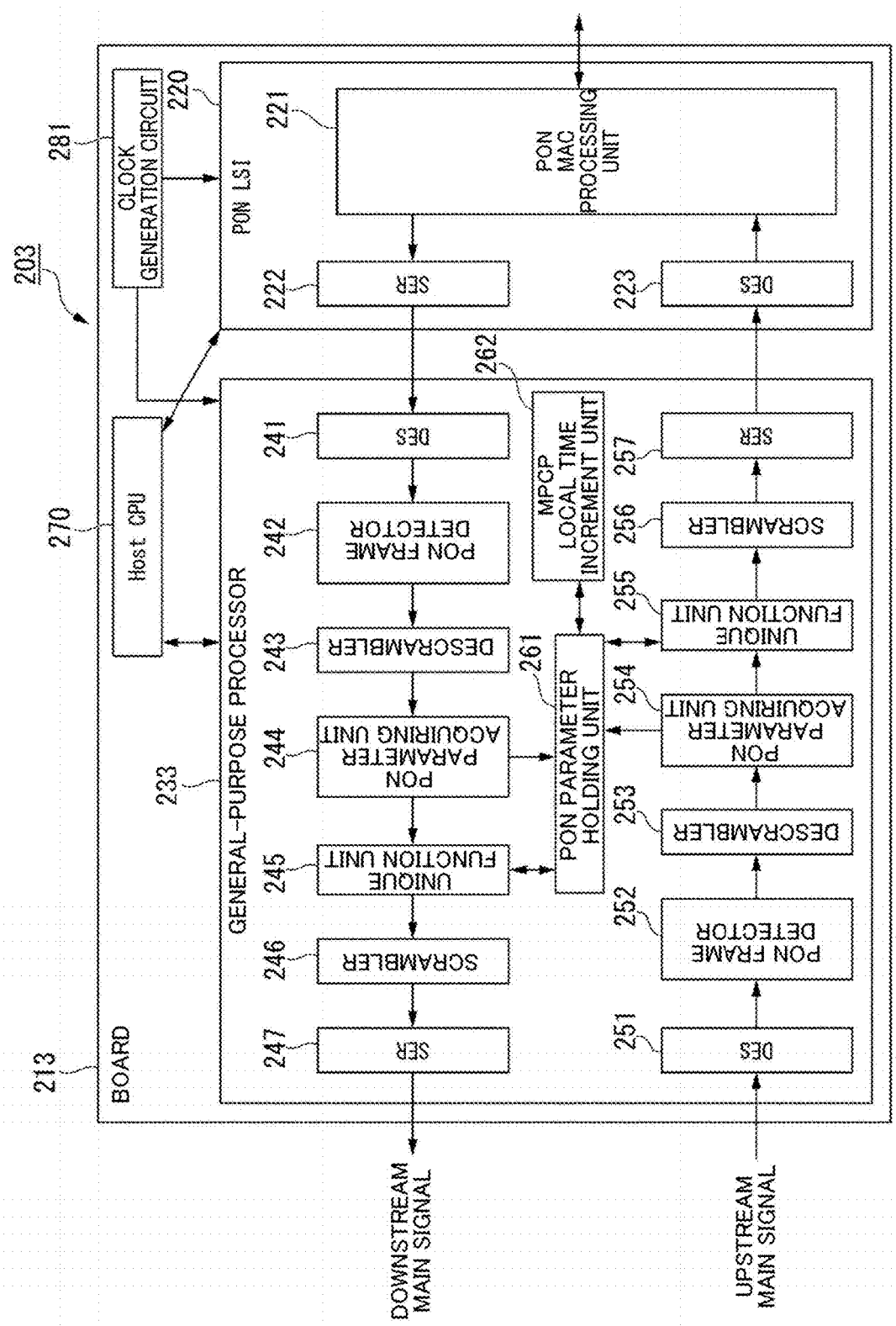
FIG. 8 is a block diagram showing a configuration of an OLT according to a second embodiment.

FIG. 8 is a block diagram showing a configuration of an OLT 203 according to the second embodiment. In FIG. 8, the same units as those of the OLT 200 according to the first embodiment shown in FIG. 5 are denoted with the same reference signs as those used in FIG. 5, and descriptions thereof are omitted. The OLT 203 includes a board 213. The board 213 includes the PON LSI 220, a general-purpose processor 233, the host CPU 270, and a clock generation circuit 281. The general-purpose processor 233 differs from the general-purpose processor 231 shown in FIG. 5 in that the general-purpose processor 233 further includes an MPCP local time increment unit 262.

When the general-purpose processor 233 receives a downstream signal from the PON LSI 220, the deserializer 241, the PON frame detector 242, and the descrambler 243 perform processing similar to that of the first embodiment on the downstream signal. When an MPCP frame of the downstream signal is input, the PON parameter acquiring unit 244 acquires MPCP local time from the time stamp field of the MPCP frame, and stores the MPCP local time in the PON parameter holding unit 261.

The clock generation circuit 281 generates a clock to increment MPCP local time in the PON LSI 220. Also, the clock generation circuit 281 is connected to the MPCP local time increment unit 262 of the general-purpose processor 233, and outputs the generated clock to the MPCP local time increment unit 262. The MPCP local time increment unit 262 stored in the PON parameter holding unit 261 successively increments the MPCP local time held in the PON parameter holding unit 261 in synchronization with the clock generated by the clock generation circuit 281.

Figure 9:
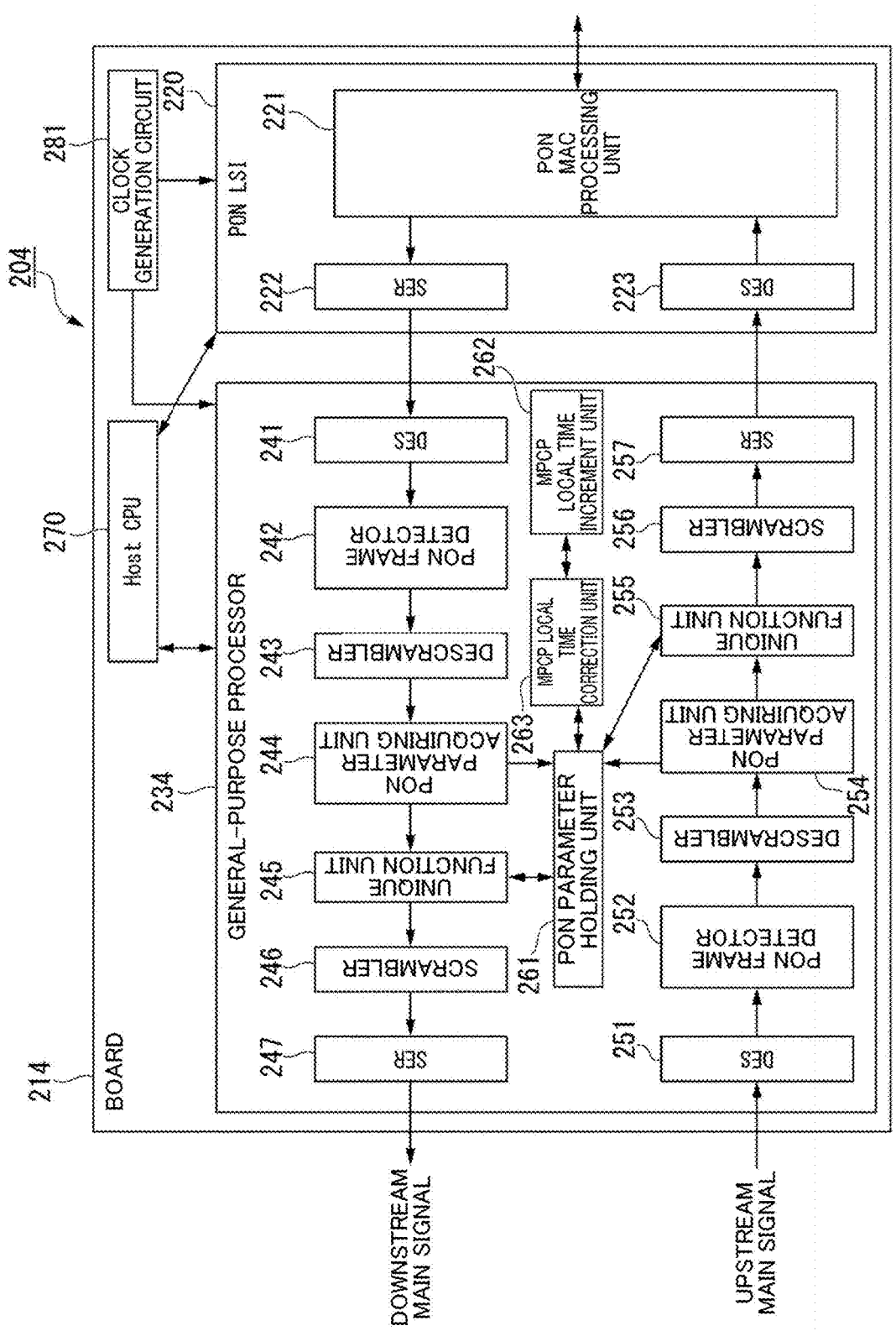
FIG. 9 is a block diagram showing a configuration of an OLT according to the second embodiment.

The OLT 2 may also have a configuration for successively correcting the MPCP local time as shown in FIG. 9, in addition to the configuration of the OLT 203 shown in FIG. 8.

FIG. 9 is a block diagram showing an OLT 204 according to the present embodiment. In FIG. 9, the same units as those of the OLT 203 shown in FIG. 8 are denoted with the same reference signs as those used in FIG. 8, and descriptions thereof are omitted. The OLT 204 includes a board 214. The board 214 includes the PON LSI 220, a general-purpose processor 234, the host CPU 270, and the clock generation circuit 281. The general-purpose processor 234 differs from the general-purpose processor 233 shown in FIG. 8 in that the general-purpose processor 234 further includes an MPCP local time correction unit 263.

MPCP frames for synchronization between the OLT and the ONU and RTT remeasurement are successively output from the PON MAC processing unit 221. The MPCP local time correction unit 263 corrects the MPCP local time held in the PON parameter holding unit 261 using information acquired by the PON parameter acquiring unit 244 from the MPCP frames.

In each of the OLT 2 and the ONU 3, the MPCP local time indicates a time that is counted up by a clock of the device. The following describes processing for using the same value of the MPCP local time for computation in the unique function of the general-purpose processor 234 of the OLT 2 and a unique function of the ONU 3.

Figure 10:
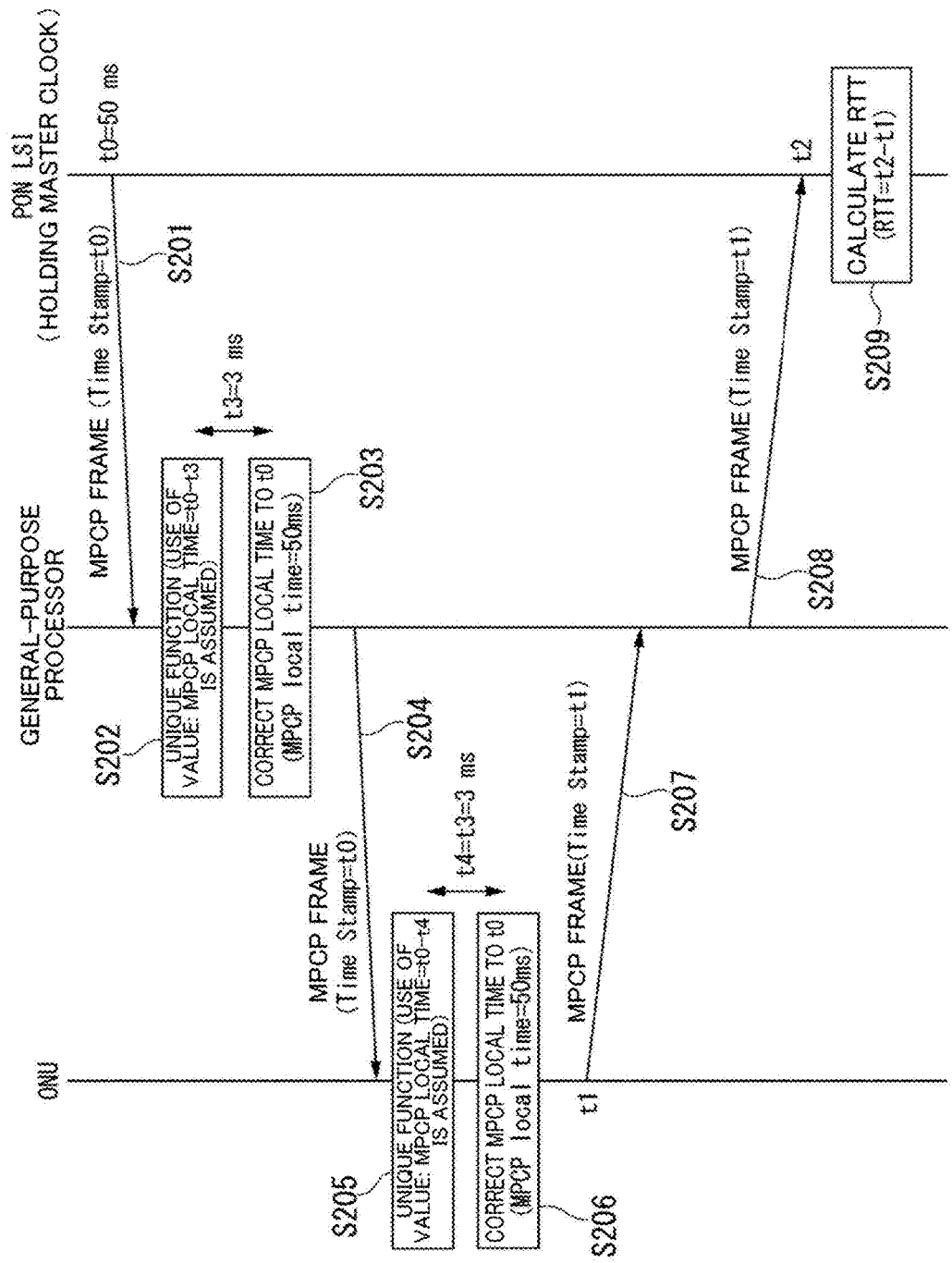
FIG. 10 is a diagram showing a sequence of MPCP local time correction in a PON system according to the second embodiment.

FIG. 10 is a diagram showing a sequence of MPCP local time correction in the PON system 1 in which the OLT 204 is used. Here, the PON LSI 220 holds a master clock. Assume that t3 represents a period of time from when MPCP local time starts to be used in the unique function of the general-purpose processor 234 to correction of the MPCP local time. Also, assume that t4 represents a period of time from when MPCP local time starts to be used in the unique function of the ONU 3 to correction of the MPCP local time. t3 and t4 can take not only positive values but also negative values depending on the processing order. FIG. 10 shows processing of a case where t3=t4.

The PON MAC processing unit 221 transmits an MPCP frame at a time t0 (step S201). The time t0 is set in the time information (time stamp field) of the MPCP frame. Assume that the time t0 is 50 ms, for example. The general-purpose processor 234 receives the MPCP frame of a downstream signal transmitted from the PON MAC processing unit 221 and performs processing similar to that performed on the downstream signal in the first embodiment. In this processing, the PON parameter acquiring unit 244 acquires the time information from the received MPCP frame and stores the time information in the PON parameter holding unit 261, and the unique function unit 245 performs processing of the unique function (step S202). Thereafter, the MPCP local time correction unit 263 corrects MPCP local time stored in the PON parameter holding unit 261 to the time t0 (50 ms) indicated by the time information acquired from the MPCP frame (step S203). As a result of this correction, the unique function unit 245 is taken to have started the processing when the MPCP local time was t0−t3=47 ms that is the period of time t3 (3 ms) back from the time t0 (50 ms).

The ONU 3 receives the MPCP frame transmitted from the OLT 204 (step S204). The ONU 3 performs processing of the unique function (step S205) and corrects MPCP local time to the time t0 (50 ms) indicated by the time information in the received MPCP frame (step S206). As a result of this correction, the ONU 3 is taken to have started the processing when the MPCP local time was t0−t4=47 ms that is the period of time t4 (3 ms) back from the time t0 (50 ms). The ONU 3 transmits an MPCP frame at a time t1 (step S207). Time information (time stamp field) indicating the transmission time t1 is set in the MPCP frame.

The general-purpose processor 234 of the OLT 204 receives the MPCP frame transmitted from the ONU 3, and performs processing similar to that performed on the upstream signal in the first embodiment. The general-purpose processor 234 outputs the MPCP frame in which the time information indicating the time t1 is set, to the PON LSI 220 (step S208). The PON MAC processing unit 221 of the PON LSI 220 receives the upstream MPCP frame at a time t2. The PON MAC processing unit 221 reads out the time t1 from the time information in the received upstream MPCP frame, and calculates RTT by subtracting the time t1 from the time t2 (step S209).

The PON system 1 executes the processing described above every time an MPCP frame is output by the PON LSI 220 of the OLT 204. When a downstream main signal frame is input from the PON LSI 220, the general-purpose processor 234 does not correct the MPCP local time, but the unique function unit 245 waits for the period of time t3 before performing processing or corrects time information of the MPCP local time used in the unique function. The MPCP local time correction unit 263 may also correct the MPCP local time to t0+α, taking a further shift a of the time information in the general-purpose processor 234 into consideration.

Figure 11:
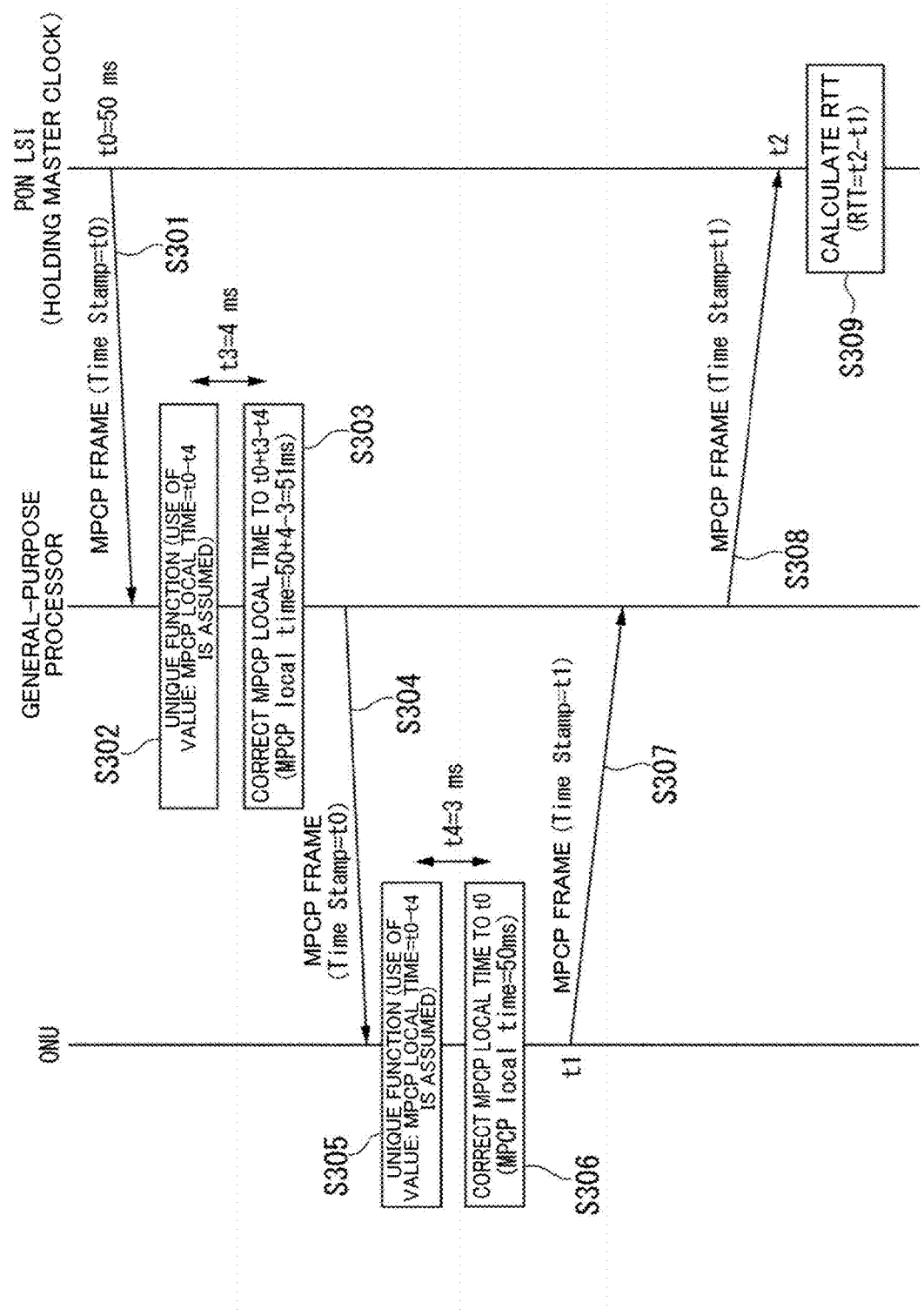
FIG. 11 is a diagram showing a sequence of MPCP local time correction in the PON system according to the second embodiment.

FIG. 11 is a diagram showing a sequence of MPCP local time correction in a case where the period of time t3 and the period of time t4 differ from each other in the PON system 1 in which the OLT 204 is used. Similarly to step S201 in FIG. 10, the PON MAC processing unit 221 transmits an MPCP frame at the time t0 (50 ms) (step S301). The general-purpose processor 234 receives the MPCP frame of a downstream signal transmitted from the PON MAC processing unit 221 and performs processing similar to that performed on the downstream signal in the first embodiment. In this processing, the PON parameter acquiring unit 244 acquires time information from the received MPCP frame and stores the time information in the PON parameter holding unit 261, and the unique function unit 245 performs processing of the unique function (step S302). Thereafter, the MPCP local time correction unit 263 corrects MPCP local time stored in the PON parameter holding unit 261 to t0+t3−t4=50 ms+4 ms−3 ms=51 ms (step S303). As a result of this correction, the unique function unit 245 is taken to have started the processing when the MPCP local time was t0−t3=47 ms that is the period of time t3 (4 ms) back from the time t0 (51 ms).

Processing performed by the ONU 3 is similar to that shown in FIG. 10. Specifically, the ONU 3 receives the MPCP frame from the OLT 204 (step S304). The ONU 3 performs processing of the unique function (step S305) and corrects MPCP local time to the time t0 (50 ms) indicated by the time information in the received MPCP frame (step S306). As a result of this correction, the ONU 3 is taken to have started the processing when the MPCP local time was t0−t4=47 ms that is the period of time t4 (3 ms) back from the time t0 (50 ms). At the time t1, the ONU 3 transmits an MPCP frame in which time information indicating the transmission time t1 is set (step S307).

The general-purpose processor 234 of the OLT 204 receives the MPCP frame transmitted from the ONU 3, and performs processing similar to that performed on the upstream signal in the first embodiment. The general-purpose processor 234 outputs the MPCP frame in which the time information indicating the time t1 is set, to the PON LSI 220 (step S308). The PON MAC processing unit 221 of the PON LSI 220 receives the upstream MPCP frame at the time t2. The PON MAC processing unit 221 reads out the time t1 from the time information in the received upstream MPCP frame, and calculates RTT by subtracting the time t1 from the time t2 (step S309).

As described above, in step S303, the MPCP local time correction unit 263 corrects the MPCP local time held in the PON parameter holding unit 261 to t0+t3−t4. Thus, the MPCP local time in the general-purpose processor 234 is corrected such that the same MPCP local time value can be used in the unique function of the general-purpose processor 234 and the unique function of the ONU 3 and the value can be used in the unique function unit 245 of the general-purpose processor 234 ideally when the MPCP local time is t0−t4.

Note that a configuration is also conceivable in which the general-purpose processor 234 does not implement the unique function in a Discovery process, but the general-purpose processor 234 waits for the period of time t3 so that a difference will not occur between RTT that is acquired through the Discovery process and RTT that is measured through periodical transmission and reception of an MPCP frame. Also, when a downstream main signal frame is input from the PON LSI 220, the general-purpose processor 234 does not correct the MPCP local time, but the unique function unit 245 waits for the period of time t3 before performing processing or corrects time information of the MPCP local time used in the unique function. The MPCP local time correction unit 263 may also correct the MPCP local time to t0+t3−t4+α, taking a further shift a of the time information in the general-purpose processor 234 into consideration.

Third Embodiment

An OLT according to the present embodiment makes it possible to synchronize time information if a pin of a clock generation circuit cannot be connected from the PON LSI to the general-purpose processor after the time information is shared between the PON LSI and the general-purpose processor similarly to the first embodiment. A clock generation circuit that generates a clock having the same frequency as that generated by the clock generation circuit in the PON LSI is arranged in the general-purpose processor.

Figure 12:
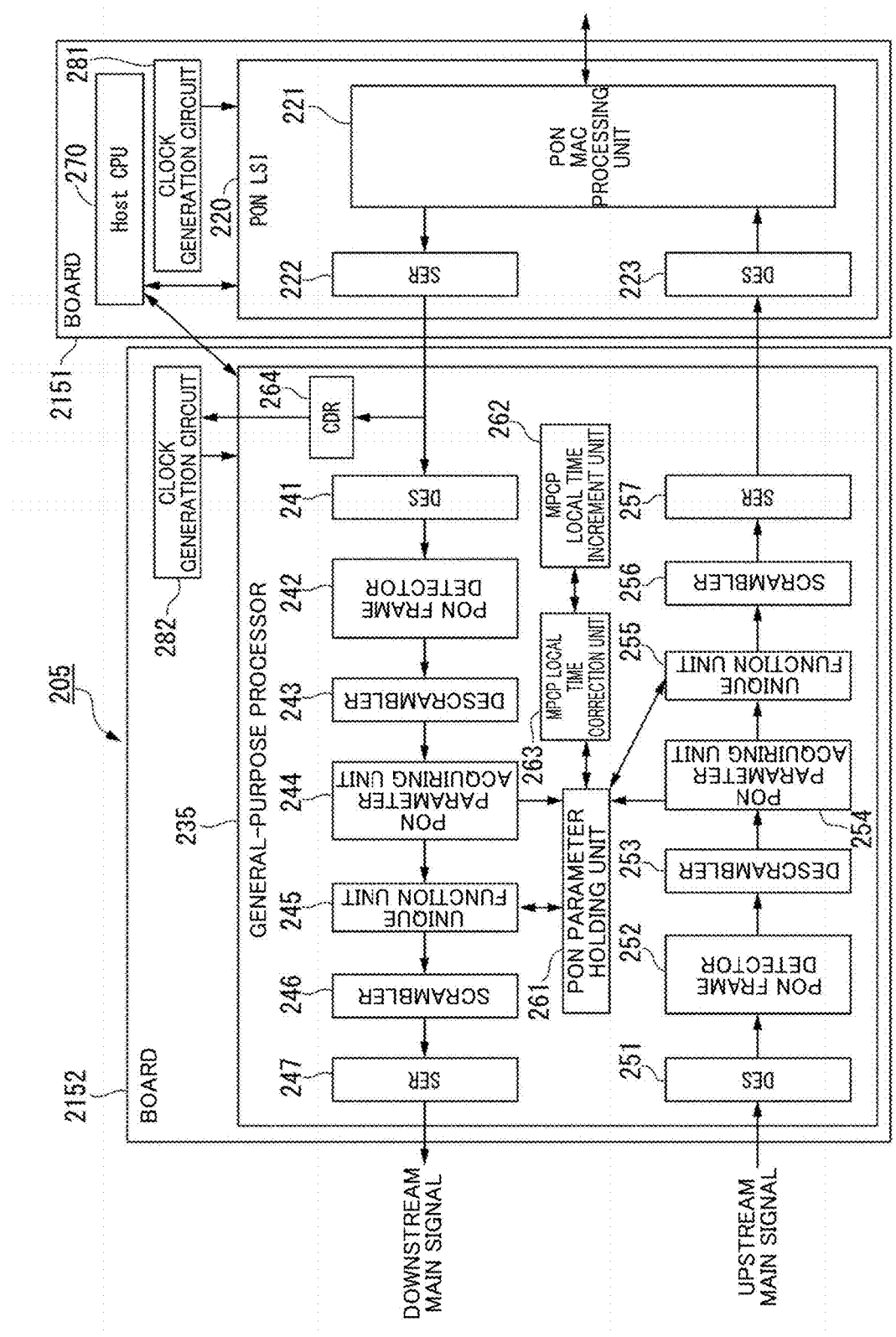
FIG. 12 is a block diagram showing a configuration of an OLT according to a third embodiment.

FIG. 12 is a block diagram showing a configuration of an OLT 205 according to the third embodiment. In FIG. 12, the same units as those of the OLT 204 shown in FIG. 9 are denoted with the same reference signs as those used in FIG. 9, and descriptions thereof are omitted. The OLT 205 includes a board 2151 and a board 2152. The board 2151 includes the PON LSI 220, the host CPU 270, and the clock generation circuit 281. The board 2152 includes a general-purpose processor 235 and a clock generation circuit 282. The general-purpose processor 235 differs from the general-purpose processor 234 shown in FIG. 9 in that the general-purpose processor 235 further includes a CDR (Clock Data Recovery) circuit 264. The CDR reproduces a clock signal from a signal that is output from the PON LSI 220, and outputs the clock signal to the clock generation circuit 282. Based on the clock signal output from the CDR 264, the clock generation circuit 282 generates a clock for incrementing MPCP local time held in the PON parameter holding unit 261.

Similarly to the second embodiment, when an MPCP frame is input, the PON parameter acquiring unit 244 acquires MPCP local time from the time stamp field of the MPCP frame, and stores the MPCP local time in the PON parameter holding unit 261. The clock generation circuit 282 is connected to the MPCP local time increment unit 262. The MPCP local time increment unit 262 increments the MPCP local time held in the PON parameter holding unit 261 in synchronization with the clock that is generated by the clock generation circuit 282 based on the clock signal output from the CDR 264. Also, the MPCP local time correction unit 263 corrects the MPCP local time, taking individual clock differences into consideration. The correction is performed using a method similar to those described in the second embodiment using FIGS. 10 and 11. That is, the PON parameter acquiring unit 244 acquires MPCP local time from an MPCP frame that is periodically transmitted to synchronize time information between the OLT and the ONU, and updates the MPCP local time held in the PON parameter holding unit 261 using the acquired value.

Note that the host CPU 270 may transmit data to the PON parameter holding unit 261, and the PON parameter holding unit 261 may receive and hold the data. The unique function unit 245 can also read out the data transmitted by the host CPU 270 from the PON parameter holding unit 261 and execute the unique function according to the data value.

Fourth Embodiment

In an OLT according to the present embodiment, time information is shared between the PON LSI and the general-purpose processor similarly to the first embodiment, and the OLT rewrites an MPCP frame transmitted by the PON LSI, using a clock of the general-purpose processor as a master clock. Thus, the ONU and the general-purpose processor are synchronized.

Figure 13:
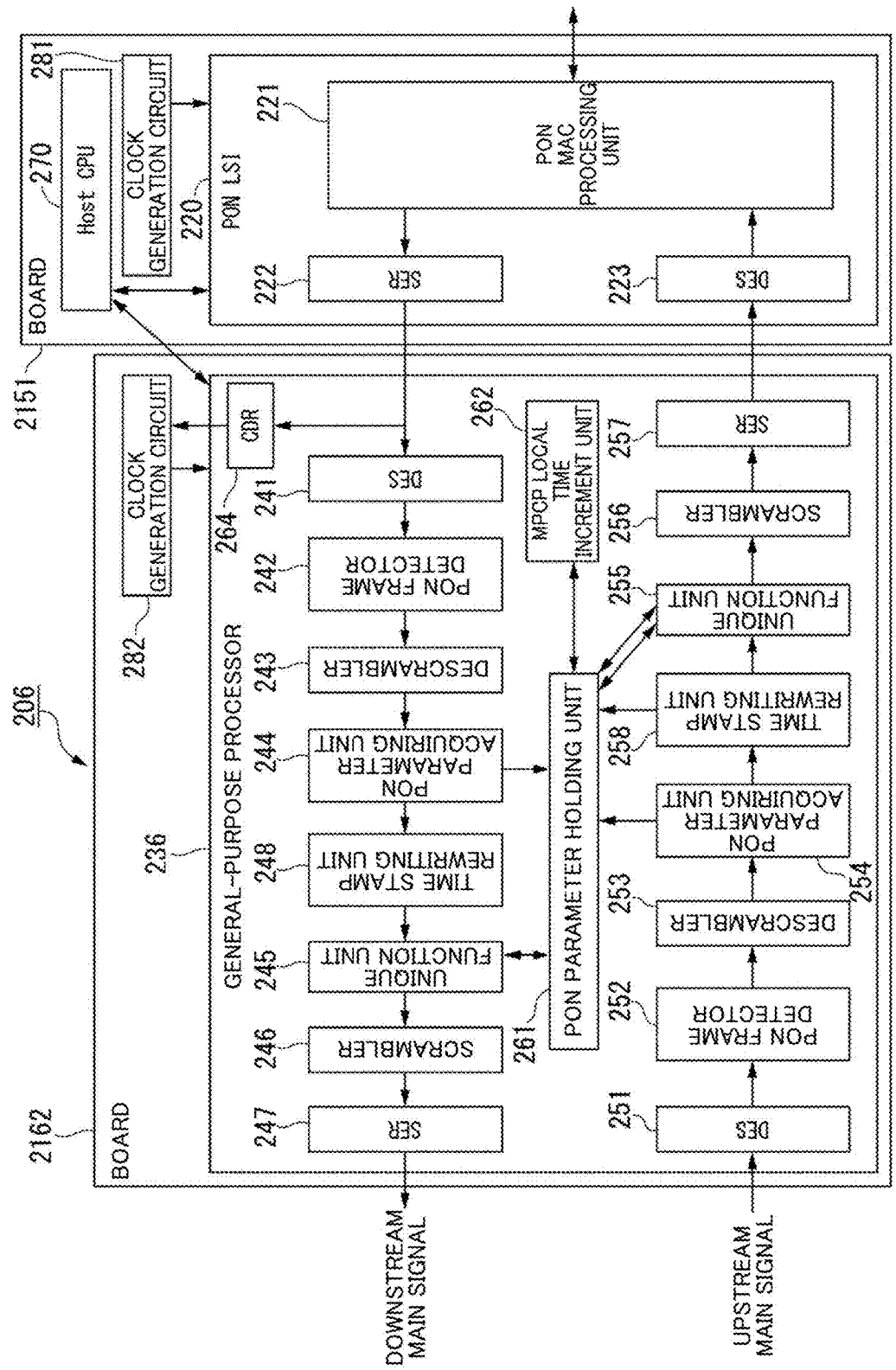
FIG. 13 is a block diagram showing a configuration of an OLT according to a fourth embodiment.

FIG. 13 is a block diagram showing a configuration of an OLT 206 according to the fourth embodiment. In FIG. 13, the same units as those of the OLT 205 according to the third embodiment shown in FIG. 12 are denoted with the same reference signs as those used in FIG. 12, and descriptions thereof are omitted. The OLT 206 includes the board 2151 and a board 2162. The board 2162 includes a general-purpose processor 236 and the clock generation circuit 282. The general-purpose processor 236 differs from the general-purpose processor 235 shown in FIG. 12 in that the general-purpose processor 236 further includes a time stamp rewriting unit 248 as a configuration relating to a downstream main signal and a time stamp rewriting unit 258 as a configuration relating to an upstream main signal.

The PON parameter acquiring unit 244 acquires time information t0 from the time stamp field in an MPCP frame of a downstream main signal, and stores the time information t0 in the PON parameter holding unit 261. The time stamp rewriting unit 248 rewrites the time stamp field in the MPCP frame of the downstream main signal to use MPCP local time of the same value in the ONU 3 and the general-purpose processor 236.

The PON parameter acquiring unit 254 acquires time information t1 that indicates a transmission time in the ONU 3 from the time stamp field in an MPCP frame of an upstream main signal. The time stamp rewriting unit 258 rewrites the time stamp field in the MPCP frame using the time information t1 to restore the time information that has been rewritten to the original information so that the PON MAC processing unit 221 can correctly measure RTT.

Figure 14:
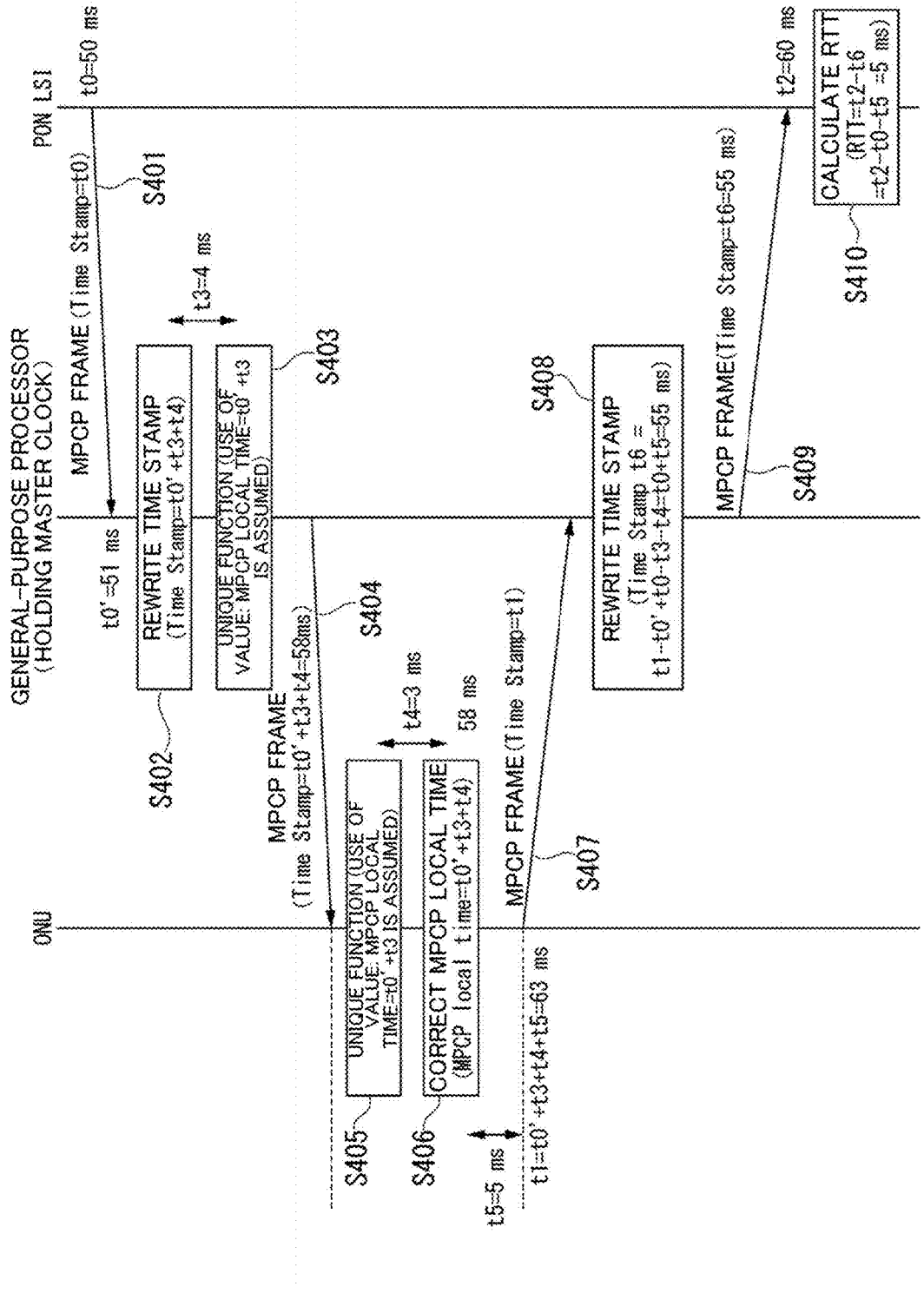
FIG. 14 is a diagram showing a sequence of MPCP local time correction in a PON system according to the fourth embodiment.

FIG. 14 is a diagram showing a sequence of MPCP local time synchronization between the general-purpose processor 236 and the ONU 3 in the PON system 1 in which the OLT 206 is used. In each of the general-purpose processor 236 and the ONU 3, the MPCP local time indicates a time that is counted up by a clock of the device. The processing shown in FIG. 14 makes it possible to use the same synchronized value of the MPCP local time in the unique function of the general-purpose processor 236 and the unique function of the ONU 3.

To perform synchronization, the OLT 206 rewrites time information (time stamp field) in an MPCP frame, using the clock held by the general-purpose processor 235 as a master clock. Assume that t3 represents a period of time from when the time stamp is rewritten in the general-purpose processor 235 to when MPCP local time is used in the unique function unit 245, and t4 represents a period of time when MPCP local time is used in the unique function of the ONU 3 to when the MPCP local time is corrected. t3 and t4 can take not only positive values but also negative values depending on the processing order. Here, it is assumed that the period of time t3 is 4 ms and the period of time t4 is 3 ms.

The PON MAC processing unit 221 transmits an MPCP frame at a time t0 (step S401). The time t0 is set in the time information (time stamp field) of the MPCP frame. Assume that the time t0 is 50 ms. The deserializer 241, the PON frame detector 242, the descrambler 243, and the PON parameter acquiring unit 244 of the general-purpose processor 236 perform processing similar to that of the first and second embodiments. The PON parameter acquiring unit 244 stores the time t0 read out from the time information in the MPCP frame, in the PON parameter holding unit 261.

Upon acquiring a time t0' that is output from the clock generation circuit 282, the time stamp rewriting unit 248 rewrites the time information in the MPCP frame to t0'+t3+t4 (step S402). In a case where t0' is 51 ms, for example, the time stamp rewriting unit 248 rewrites the time information to t0'+t3+t4=51 ms+3 ms+4 ms=58 ms. Thereafter, the unique function unit 245 performs processing of the unique function (step S403). The unique function unit 245 is taken to have started the processing when the MPCP local time was t0'+t3=51 ms+4 ms=55 ms. The general-purpose processor 236 transmits the MPCP frame in which the time information has been rewritten to the ONU 3 (step S404).

Upon receiving the MPCP frame transmitted from the OLT 206, the ONU 3 performs processing of the unique function (step S405), and corrects MPCP local time to the time t0'+t3+t4 (58 ms) indicated by the time information in the received MPCP frame (step S406). As a result of this correction, the ONU 3 is taken to have started the processing when the MPCP local time was 58−3=55 ms that is the period of time t4 (3 ms) back from the time t0'+t3+t4 (58 ms). This is the same as the time when the unique function unit 245 of the general-purpose processor started the unique function. After a period of time t5 has elapsed from when the MPCP local time was corrected, the ONU 3 transmits an MPCP frame (step S407). The ONU 3 sets, in the time information (time stamp field) of the MPCP frame, a time t1 at which the period of time t5 elapses from the time t0'+t3+t4 at which the correction was performed. If the period of time t5 is 5 ms, for example, the time t1 is 58 ms+5 ms=63 ms.

When the OLT 206 has received the MPCP frame, the deserializer 251, the PON frame detector 252, the descrambler 253, and the PON parameter acquiring unit 254 of the general-purpose processor 236 perform processing similar to that performed on the upstream signal in the first and second embodiments. The PON parameter acquiring unit 254 reads out the time t1 from the time information in the MPCP frame. The time stamp rewriting unit 258 rewrites the time information in the MPCP frame to t6=t1−t0'+t0−t3−t4 (step S408). Specifically, t6=63 ms−51 ms+50 ms−4 ms−3 ms=55 ms. The general-purpose processor 236 outputs the MPCP frame in which the time information indicating the time t6 is set, to the PON LSI 220 (step S409).

The PON MAC processing unit 221 of the PON LSI 220 receives the upstream MPCP frame at a time t2. The PON MAC processing unit 221 reads out the time t6 from the time information in the received upstream MPCP frame, and calculates RTT by subtracting the time t6 from the time t2 (step S410). In a case where the time t2 is 60 ms, RTT=t2−t6=60 ms−55 ms=5 ms.

When a downstream main signal frame is input from the PON LSI 220, the general-purpose processor 236 does not correct the MPCP local time, but the unique function unit 245 waits for the period of time t3 before performing processing or corrects time information of the MPCP local time used in the unique function. A configuration is also conceivable in which the general-purpose processor 234 does not implement the unique function in a Discovery process, but the general-purpose processor 236 waits for the period of time t3 so that a difference will not occur between RTT that is acquired through the Discovery process and RTT that is measured through periodical transmission and reception of an MPCP frame.

When a downstream main signal frame is input from the PON LSI 220, the time stamp rewriting unit 248 may also correct the time information (time stamp frame) to t0'+t3+t4+α, taking a further shift α of the time information in the downstream MPCP frame into consideration. Also, the time stamp rewriting unit 258 may also correct the time information to t6=t1−t0'+t0−t3−t4+β, taking a further shift β of the time information in an upstream MPCP frame received by the general-purpose processor 236 into consideration.

Fifth Embodiment

An OLT according to the present embodiment implements a unique function using an LLID. The OLT can execute a unique function according to each ONU 3 by using the LLID. The following mainly describes differences from the first embodiment, and the differences may also be implemented in the other embodiments described above.

Figure 15:
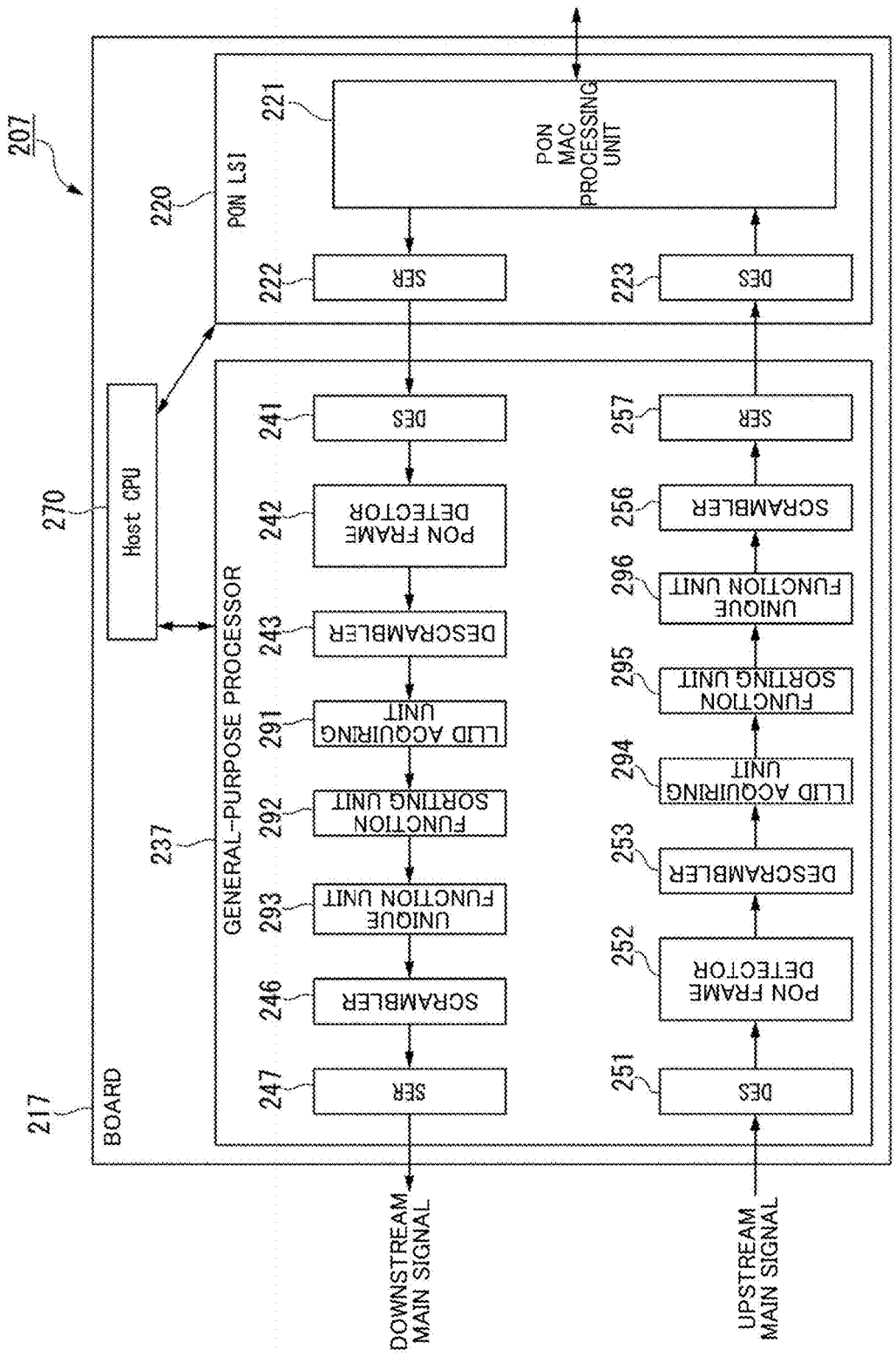
FIG. 15 is a block diagram showing a configuration of an OLT according to a fifth embodiment.

FIG. 15 is a block diagram showing a configuration of an OLT 207 according to the fifth embodiment. In FIG. 15, the same units as those of the OLT 200 according to the first embodiment shown in FIG. 5 are denoted with the same reference signs as those used in FIG. 5, and descriptions thereof are omitted. The OLT 207 includes a board 217. The board 217 includes the PON LSI 220, a general-purpose processor 237, and the host CPU 270. The general-purpose processor 237 differs from the general-purpose processor 231 shown in FIG. 5 in that the general-purpose processor 237 includes an LLID acquiring unit 291, a function sorting unit 292, and a unique function unit 293, instead of the PON parameter acquiring unit 244 and the unique function unit 245, and includes an LLID acquiring unit 294, a function sorting unit 295, and a unique function unit 296, instead of the PON parameter acquiring unit 254 and the unique function unit 255.

The LLID acquiring unit 291 acquires an LLID of a downstream signal from a main signal. The function sorting unit 292 selects a unique function (function A1 or B1 or . . . ) that is to be executed from among a plurality of unique functions, according to the value of the LLID acquired by the LLID acquiring unit 291. The unique function unit 293 executes the unique function selected by the function sorting unit 292 from among the plurality of unique functions (functions A1, B1, . . . ).

The same also applies to an upstream signal. That is, the LLID acquiring unit 294 acquires an LLID from an upstream PON frame. The function sorting unit 295 selects a unique function (function A2 or B2 or . . . ) that is to be executed from among a plurality of unique functions, according to the value of the LLID acquired by the LLID acquiring unit 294. The unique function unit 296 executes the unique function selected by the function sorting unit 295 from among the plurality of unique functions (functions A2, B2, . . . ).

Sixth Embodiment

An OLT 2 according to the present embodiment implements a unique function in which CRC check data is used. The following mainly describes differences from the first embodiment, and the differences may also be implemented in the other embodiments described above.

Figure 16:
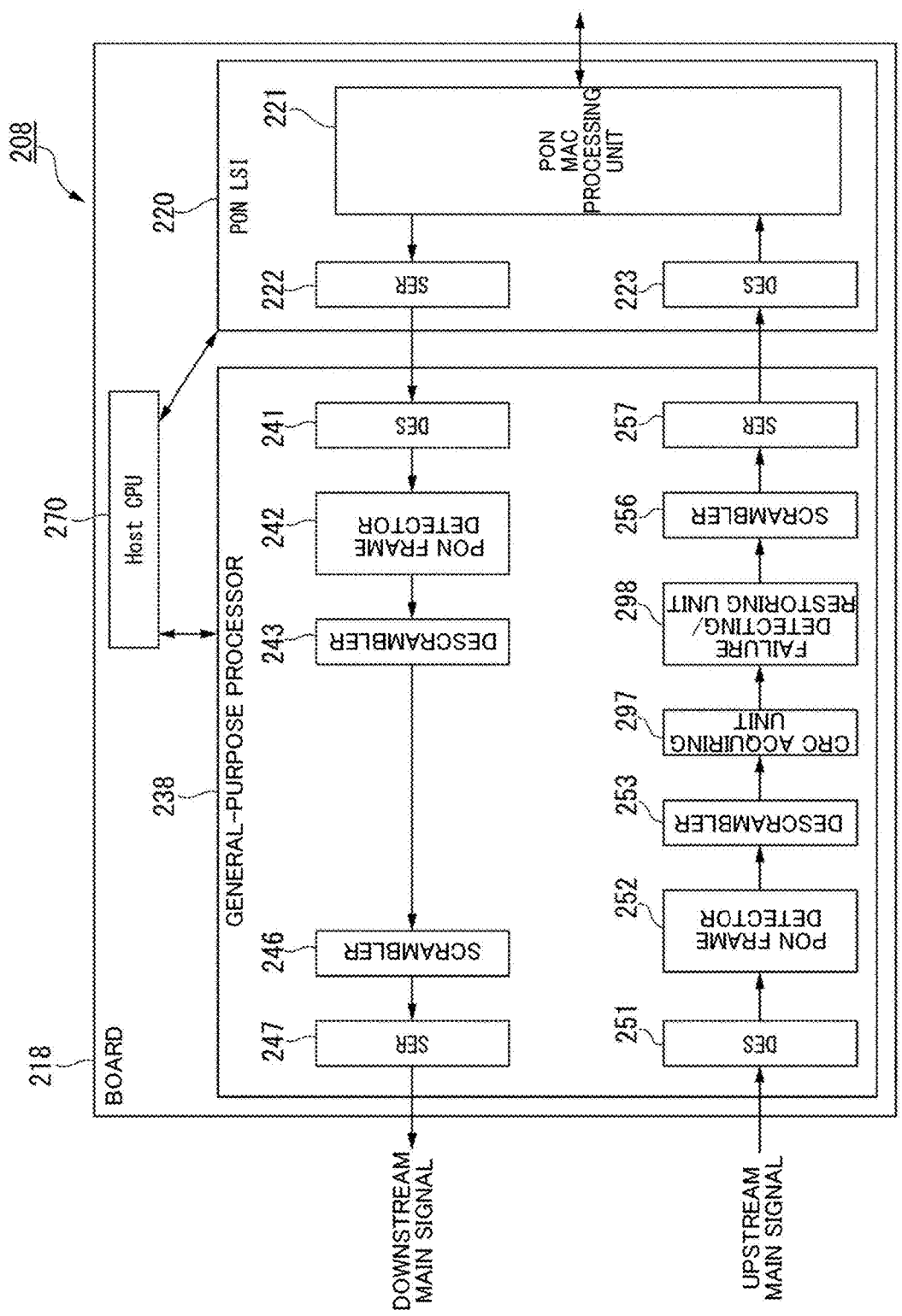
FIG. 16 is a block diagram showing a configuration of an OLT according to a sixth embodiment.

FIG. 16 is a block diagram showing a configuration of an OLT 208 according to the sixth embodiment. In FIG. 16, the same units as those of the OLT 200 according to the first embodiment shown in FIG. 5 are denoted with the same reference signs as those used in FIG. 5, and descriptions thereof are omitted. The OLT 208 includes a board 218. The board 218 includes the PON LSI 220, a general-purpose processor 238, and the host CPU 270. The general-purpose processor 238 differs from the general-purpose processor 231 shown in FIG. 5 in that the general-purpose processor 238 does not include the PON parameter acquiring unit 244 and the unique function unit 245 and includes a CRC acquiring unit 297 and a failure detecting/restoring unit 298, instead of the PON parameter acquiring unit 254 and the unique function unit 255.

The CRC acquiring unit 297 acquires CRC check data from a frame of an input upstream main signal. The failure detecting/restoring unit 298 checks errors using the CRC check data acquired by the CRC acquiring unit 297. Upon detecting a failure based on the number of times or frequency of the occurrence of an error in the main signal, the failure detecting/restoring unit 298 notifies an administrator of the failure. The failure detecting/restoring unit 298 corrects errors in the upstream main signal and continues communication.

According to the embodiments described above, the OLT can acquire a PON parameter from a main signal transmitted in ordinary communication without the need to perform communication for sharing the parameter of a PON function between the PON LSI and the general-purpose processor. Therefore, a delay that occurs due to the acquisition of the PON parameter can be reduced. Also, a unique function can be performed in the general-purpose processor according to the PON parameter. Furthermore, even if a processing time of the general-purpose processor is reduced as a result of the unique function being changed, for example, it is possible to correct a difference when time information is shared between the PON LSI or the ONU and the general-purpose processor. Therefore, the PON LSI or the ONU and the general-purpose processor can use the same time information when executing processing.

According to the embodiments described above, a communication system includes a first processor and a second processor. For example, the communication system is the OLT 2, the first processor is the PON LSI 22, and the second processor is the general-purpose processor 23. The first processor performs processing for transmitting a signal to and receiving a signal from a communication destination device. The communication destination device is the ONU 3, for example. In a case where the communication system is used in a subscriber line terminal station device, the first processor performs communication processing of a passive optical network on a signal that is transmitted to or received from a subscriber line terminal device.

The second processor performs processing of an additional function. The second processor includes a decoding unit, an information acquiring unit, an additional function executing unit, and an encoding unit. For example, the decoding unit is the descrambler 243 or 253, the information acquiring unit is the PON parameter acquiring unit 244 or 254, the additional function executing unit is the unique function unit 245 or 255, and the encoding unit is the scrambler 246 or 256. The decoding unit decodes a transmission signal that is encoded by the first processor or a reception signal that is encoded by the communication destination device. The information acquiring unit acquires information from the transmission signal or the reception signal decoded by the decoding unit. The additional function executing unit performs processing of the additional function using the information acquired by the information acquiring unit. The encoding unit performs processing for encoding the decoded transmission signal and outputting a resulting signal to the communication destination device or processing for encoding the decoded reception signal and outputting a resulting signal to the first processor.

The second processor may further include an updating unit that updates time information acquired by the information acquiring unit from the transmission signal in synchronization with a first clock included in the first processor or a second clock included in the second processor. For example, the updating unit is the MPCP local time increment unit 262, the first clock is the clock generation circuit 281, and the second clock is the CDR circuit 264 and the clock generation circuit 282.

Note that the second processor may further include a correction unit that corrects time information using a difference between a time at which predetermined processing is started in the communication destination device and a time at which the additional function is started in the second processor. The correction unit is the MPCP local time correction unit 263, for example.

Also, the second processor may further include a first time rewriting unit and a second time rewriting unit described below. The first time rewriting unit rewrites time information that is set in the transmission signal decoded by the decoding unit, by using time information that is output from the second clock. The second time rewriting unit rewrites time information that is set in the reception signal transmitted from the communication destination device and decoded by the decoding unit, by using time information that is output from the second clock and time information that has been set in the transmission signal before rewriting, the reception signal being transmitted with respect to the transmission signal in which the time information has been rewritten. For example, the first time rewriting unit is the time stamp rewriting unit 248, and the reception time information rewriting unit is the time stamp rewriting unit 258.

Although the embodiments of the present invention have been described in detail with reference to the drawings, specific configurations are not limited to these embodiments and also include design or the like within a scope not departing from the gist of the present invention.

INDUSTRIAL APPLICABILITY

The present invention is applicable to a communication device including a plurality of processors.

REFERENCE SIGNS LIST

1 PON system
2, 200, 201, 202, 203, 204, 205, 206, 207 OLT
3 ONU
4 Optical coupler
5, 6 Optical fiber
21, 210, 211, 212, 213, 214, 217, 2151, 2152, 2162 Board
22, 220 PON LSI
23, 230, 231, 232, 233, 234, 235, 236, 237 General-purpose processor
26, 270 Host CPU
221 PON MAC processing unit
222, 247, 257 Serializer
223, 241, 251 Deserializer
242, 252 PON frame detector
243, 253 Descrambler
244, 254 PON parameter acquiring unit
245, 255 Unique function unit
246, 256 Scrambler
248, 258 Time stamp rewriting unit
261 PON parameter holding unit
262 MPCP local time increment unit
263 MPCP local time correction unit
264 CDR circuit 281, 282 Clock generation circuit
291, 294 LLID acquiring unit
292, 295 Function sorting unit
293, 296 Unique function unit

The invention claimed is:

1. A communication system comprising:
   a first processor configured to perform processing for transmitting a signal to and receiving a signal from a communication destination device, wherein the first processor is a passive optical network processor (PON) and includes one or more PON functions;
   a second processor configured to perform processing of an additional function that is an additional PON function associated with the first processor, wherein the second processor is a general-purpose processor, and wherein the additional function includes a unique function associated with a PON parameter, and wherein the PON parameter is shared between the first processor and the second processor; and
   a storage medium having computer program instructions stored thereon, when executed by the second processor, perform to:
   a decoding unit configured to decode a transmission signal encoded by the first processor or a reception signal encoded by the communication destination device, wherein the transmission signal includes the PON parameter;
   an information acquiring unit configured to acquire information from the transmission signal or the reception signal decoded by the decoding unit, wherein the information includes the PON parameter;
   an additional function executing unit configured to perform the processing of the additional function using the PON parameter acquired by the information acquiring unit;
   an encoding unit configured to perform processing for encoding the decoded transmission signal and outputting a resulting signal to the communication destination device or processing for encoding the decoded reception signal and outputting a resulting signal to the first processor;
   an updating unit configured to update time information acquired by the information acquiring unit from the transmission signal in synchronization with a first clock included in the first processor or a second clock included in the second processor; and
   a correction unit configured to correct the time information using a difference between a time at which predetermined processing is started in the communication destination device and a time at which the additional function is started in the second processor.

2. The communication system according to claim 1, wherein the computer program instructions further performs:
   a first time rewriting unit configured to rewrite the time information that is set in the transmission signal decoded by the decoding unit, by using time information that is output from the second clock; and
   a second time rewriting unit configured to rewrite time information that is set in the reception signal transmitted from the communication destination device and decoded by the decoding unit, by using time information that is output from the second clock and time information that has been set in the transmission signal before rewriting, the reception signal being transmitted with respect to the transmission signal in which the time information has been rewritten.

3. A subscriber line terminal station device comprising:
   a first processor configured to perform communication processing of a passive optical network on a signal that is transmitted to or received from a subscriber line terminal device, wherein the first processor is a passive optical network processor (PON) and includes one or more PON functions;
   a second processor configured to perform processing of an additional function that is an additional PON function associated with the first processor, wherein the second processor is a general-purpose processor, and wherein the additional function includes a unique function associated with a PON parameter, and wherein the PON parameter is shared between the first processor and the second processor; and
   a storage medium having computer program instructions stored thereon, when executed by the second processor, perform to:
   a decoding unit configured to decode a transmission signal encoded by the first processor or a reception signal encoded by the communication destination device, wherein the transmission signal includes the PON parameter;
   an information acquiring unit configured to acquire information from the transmission signal or the reception signal decoded by the decoding unit, wherein the information includes the PON parameter;
   an additional function executing unit configured to perform the processing of the additional function using the PON parameter acquired by the information acquiring unit;
   an encoding unit configured to perform processing for encoding the decoded transmission signal and outputting a resulting signal to the communication destination device or processing for encoding the decoded reception signal and outputting a resulting signal to the first processor;
   an updating unit configured to update time information acquired by the information acquiring unit from the transmission signal in synchronization with a first clock included in the first processor or a second clock included in the second processor; and
   a correction unit configured to correct the time information using a difference between a time at which predetermined processing is started in the communication destination device and a time at which the additional function is started in the second processor.

4. A communication method to be carried out in a communication system that includes a first processor and a second processor, the communication method comprising:
   a transmission/reception processing step of performing, by the first processor, processing for transmitting a signal to or receiving a signal from a communication destination device, wherein the first processor is a passive optical network processor (PON) and includes one or more PON functions;
   a decoding step of decoding, by the second processor, a transmission signal encoded by the first processor or a reception signal encoded by the communication destination device; an information acquisition step of acquiring, by the second processor, information from the transmission signal or the reception signal decoded in the decoding step, wherein the second processor is a general-purpose processor, wherein the information includes a PON parameter and the PON parameter is shared between the first processor and the second processor;

an additional function executing step of performing, by the second processor, processing of an additional PON function using the information acquired in the information acquisition step, wherein the additional PON function is associated with the first processor, and wherein the additional function includes a unique function associated with the PON parameter, and an encoding step of performing, by the second processor, processing for encoding the decoded transmission signal and outputting a resulting signal to the communication destination device or processing for encoding the decoded reception signal and outputting a resulting signal to the first processor an updating step of performing, by the second processor, updating time information acquired from the transmission signal in synchronization with a first clock included in the first processor or a second clock included in the second processor; and a correction step performing, by the second processor, correcting the time information using a difference between a time at which predetermined processing is started in the communication destination device and a time at which the additional function is started in the second processor.

* * * * *